(12) United States Patent
Tamura

(10) Patent No.: US 10,827,746 B2
(45) Date of Patent: Nov. 10, 2020

(54) EFFICACY-ENHANCING AGENT COMPOSITION FOR AMINO ACID-BASED AGROCHEMICALS

(71) Applicant: KAO CORPORATION, Tokyo (JP)

(72) Inventor: Yoshinori Tamura, Shanghai (CN)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 15/765,186

(22) PCT Filed: Sep. 30, 2016

(86) PCT No.: PCT/JP2016/079074
§ 371 (c)(1),
(2) Date: Mar. 30, 2018

(87) PCT Pub. No.: WO2017/057701
PCT Pub. Date: Apr. 6, 2017

(65) Prior Publication Data
US 2018/0289000 A1  Oct. 11, 2018

(30) Foreign Application Priority Data

Oct. 1, 2015  (JP) ................. 2015-195867

(51) Int. Cl.
| | | |
|---|---|---|
| *A01N 25/22* | (2006.01) | |
| *A01N 25/30* | (2006.01) | |
| *A01N 57/20* | (2006.01) | |
| *A01N 37/12* | (2006.01) | |

(52) U.S. Cl.
CPC .............. *A01N 25/22* (2013.01); *A01N 25/30* (2013.01); *A01N 37/12* (2013.01); *A01N 57/20* (2013.01); *A01N 2300/00* (2013.01)

(58) Field of Classification Search
CPC ........ A01N 25/22; A01N 37/12; A01N 25/30; A01N 57/20; A01N 2300/00
See application file for complete search history.

(56) References Cited

U.S. PATENT DOCUMENTS

| | | |
|---|---|---|
| 5,849,663 A | 12/1998 | Hasebe et al. |
| 5,948,421 A | 9/1999 | Okano et al. |
| 6,218,336 B1 * | 4/2001 | Coleman ............... A01N 37/04 504/118 |
| 2003/0087764 A1 | 5/2003 | Pallas et al. |
| 2014/0296072 A1 | 10/2014 | Wacker et al. |

FOREIGN PATENT DOCUMENTS

| | | |
|---|---|---|
| CN | 1190327 A | 8/1998 |
| CN | 1070337 C | 9/2001 |
| CN | 1075352 C | 11/2001 |
| CN | 1376033 A | 10/2002 |
| CN | 1285262 C | 11/2006 |
| CN | 1321566 C | 6/2007 |
| CN | 101163405 A | 4/2008 |
| CN | 102503841 A | 6/2012 |
| CN | 102962005 A | 3/2013 |
| CN | 103975068 A | 8/2014 |
| CN | 104093305 A | 10/2014 |
| CN | 104814008 A | 8/2015 |
| JP | 9-295901 A | 11/1997 |
| JP | 10-501800 A | 2/1998 |
| JP | 2004-2107 A | 1/2004 |
| WO | WO 96/32839 A2 | 10/1996 |
| WO | WO 01/17358 A1 | 3/2001 |
| WO | WO 2006/096480 A1 | 9/2006 |
| WO | WO 2013/039990 A1 | 3/2013 |

OTHER PUBLICATIONS

International Search Report issued in PCT/JP2016/079074 (PCT/ISA/210), dated Dec. 20, 2016.
International Preliminary Report on Patentability and an English Translation of the Written Opinion of the International Searching Authority (Forms PCT/IB/373 and PCT/ISA/237), dated Apr. 3, 2018, for International Application No. PCT/JP2016/079074.
Extended European Search Report dated Apr. 12, 2019, for corresponding European Application No. 16851870.2.
Chinese Office Action and Search Report for Chinese Application No. 201680053516.X, dated Jun. 12, 2020, with an English translation.

* cited by examiner

*Primary Examiner* — John Pak
*Assistant Examiner* — Daniel L Branson
(74) *Attorney, Agent, or Firm* — Birch, Stewart, Kolasch & Birch, LLP

(57) ABSTRACT

The present invention is an efficacy-enhancing agent composition for amino acid-based agrochemicals, containing, in a specific ratio, specific three quaternary ammonium salts having an ester group, and a specific fatty acid.

4 Claims, No Drawings

EFFICACY-ENHANCING AGENT COMPOSITION FOR AMINO ACID-BASED AGROCHEMICALS

FIELD OF THE INVENTION

The present invention relates to an efficacy-enhancing agent composition for amino acid-based agrochemicals, an agrochemical composition, and a weeding method.

BACKGROUND OF THE INVENTION

Conventionally, in order to fully bring out the effects of agrochemicals, various surfactants have been used in agrochemical-containing compositions. As is known, for an amino acid-based agrochemical such as a glyphosate salt, which is one of active ingredients most often used particularly as a herbicide, application of a nonionic surfactant or an anionic surfactant commonly used for other agrochemicals is difficult in terms of compatibility, and hence, quaternized or polyoxyethylenated long-chain amines are effective instead for this purpose. Among amino acid-based agrochemicals such as glyphosate salts, particularly a polyoxyethylenated tallowamine is widely used due to its excellent cost performance. Since such a polyoxyethylenated tallowamine has a very low biodegradability and a strong fish toxicity, however, its impact on the environment has been a concern in recent years, and a substitute is desired. Therefore, JP-A 10-501800, for example, proposes a quaternary salt modified with polyoxyalkylene as an agrochemical efficacy-enhancing agent.

JP-A 9-295901 discloses a liquid agrochemical composition, which contains a water-soluble agrochemical active ingredient, a specific amine compound having an alkylene oxide chain or an acid salt or quaternized product thereof, and a specific amine compound or quaternized compound, and describes a glyphosate salt as the water-soluble agrochemical active ingredient.

SUMMARY OF THE INVENTION

These conventional techniques are, however, not sufficient for effectively enhancing the efficacy of an agrochemical.

The present invention provides an efficacy-enhancing agent composition for amino acid-based agrochemicals, which is excellent in compatibility when mixed with an amino acid-based agrochemical, can improve formulation stability of an agrochemical composition, and can effectively enhance the efficacy of the amino acid-based agrochemical, an agrochemical composition containing the same, and a weeding method using the agrochemical composition.

The present inventor made earnest studies on techniques, with respect to an agrochemical formulation containing an amino acid-based agrochemical such as a glyphosate salt, by which a stable agrochemical formulation excellent in biodegradability and fish toxicity and excellent in cost performance can be provided and high weeding performance can be exhibited, resulting in finding the following to achieve the present invention: When a cationic compound having a specific structure and a specific fatty acid are used in combination in a specific ratio, it is possible to obtain an agrochemical efficacy-enhancing agent composition for amino acid-based agrochemicals that is excellent in compatibility when mixed with an amino acid-based agrochemical, can improve formulation stability of an agrochemical composition, and can effectively enhance the efficacy of the amino acid-based agrochemical.

The present invention relates to an efficacy-enhancing agent composition for amino acid-based agrochemicals, containing compound (A1) represented by the following general formula (1-1), compound (B) represented by the following general formula (2), and optionally compound (A2) represented by the following general formula (1-2), and optionally compound (A3) represented by the following general formula (1-3), wherein a mass ratio of a content of compound (A3) to a sum of a content of compound (A1) and a content of compound (A2), [content of compound (A3)]/[sum of content of compound (A1) and content of compound (A2)], is 0/100 or more and 9/91 or less;

a mass ratio of the content of compound (A2) to the content of compound (A1), [content of compound (A2)]/[content of compound (A1)], is 0/100 or more and 60/40 or less; and a mass ratio of a content of compound (B) to the content of compound (A1), [content of compound (B)]/[content of compound (A1)], is 1/500 or more and 1/5.2 or less:

[Formula 1]

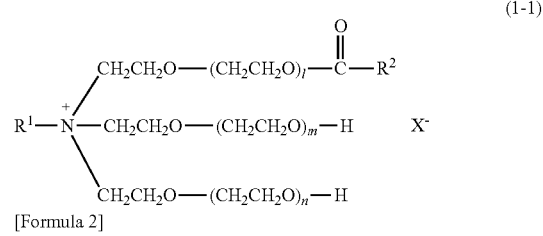

(1-1)

[Formula 2]

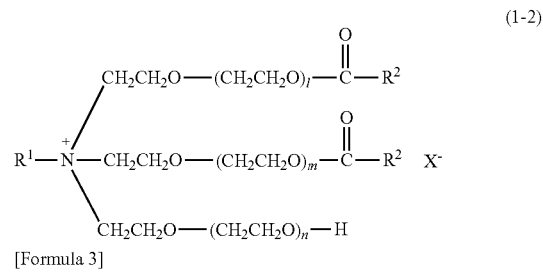

(1-2)

[Formula 3]

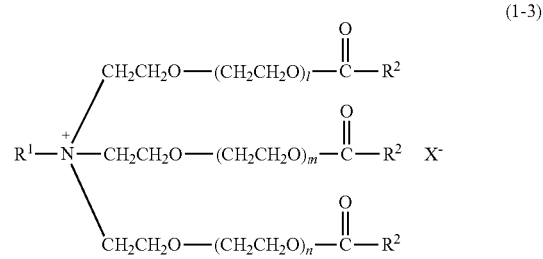

(1-3)

wherein $R^1$ denotes a linear alkyl group having 1 or more and 4 or less carbon atoms, a linear alkenyl group having 2 or more and 4 or less carbon atoms, a branched alkyl group having 3 or more and 4 or less carbon atoms, or a branched alkenyl group having 3 or more and 4 or less carbon atoms;

$R^2$ denotes a linear or branched alkyl group or alkenyl group having 5 or more and 17 or less carbon atoms; each of l, m and n denotes an average number of moles of added $CH_2CH_2O$ group, a total of l, m and n [l+m+n] being 1 or more and 15 or less; and X⁻ denotes a counter ion; and

$$R^3—COOH \quad (2)$$

wherein $R^3$ denotes a linear or branched alkyl group or alkenyl group having 5 or more and 17 or less carbon atoms.

Besides, the present invention relates to an agrochemical composition, containing compound (A1) represented by the above-described general formula (1-1), compound (B) represented by the above-described general formula (2), amino acid-based agrochemical active ingredient (C) and water, and optionally compound (A2) represented by the above-described general formula (1-2), and optionally compound (A3) represented by the above-described general formula (1-3), wherein a mass ratio of a content of compound (A3) to a sum of a content of compound (A1) and a content of compound (A2), [content of compound (A3)]/[sum of content of compound (A1) and content of compound (A2)], is 0/100 or more and 9/91 or less;

a mass ratio of the content of compound (A2) to the content of compound (A1), [content of compound (A2)]/[content of compound (A1)], is 0/100 or more and 60/40 or less; and a mass ratio of a content of compound (B) to the content of compound (A1), [content of compound (B)]/[content of compound (A1)], is 1/500 or more and 1/5.2 or less.

Furthermore, the present invention relates to a weeding method, including spraying, on a plant, an agrochemical spray solution prepared from the above-described agrochemical composition of the present invention.

In some cases hereinafter, compound (A1) represented by general formula (1-1) is designated simply as compound (A1), compound (A2) represented by general formula (1-2) is designated simply as compound (A2), compound (A3) represented by general formula (1-3) is designated simply as compound (A3), and compound (B) represented by general formula (2) is designated simply as compound (B).

According to the present invention, an efficacy-enhancing agent composition for amino acid-based agrochemicals, which is excellent in compatibility when mixed with an amino acid-based agrochemical, can improve formulation stability of an agrochemical composition, and can effectively enhance the efficacy of the amino acid-based agrochemical, is provided.

Besides, by using the efficacy-enhancing agent composition for amino acid-based agrochemicals of the present invention, an agrochemical composition, in which the efficacy of the amino acid-based agrochemical is enhanced, and which is excellent in formulation stability, is provided.

Furthermore, a weeding method excellent in a weeding effect can be provided by using the agrochemical composition of the present invention.

EMBODIMENTS OF THE INVENTION

<Efficacy-Enhancing Agent Composition for Amino Acid-Based Agrochemicals>

An amino acid-based agrochemical-enhancing agent composition of the present invention contains compound (A1) and compound (B) in a specific ratio, is excellent in compatibility when mixed with an amino acid-based agrochemical, and has effects of improving formulation stability of an agrochemical composition, and effectively enhancing the efficacy of the amino acid-based agrochemical. The reason why these effects are exhibited is not clear, but is assumed as follows:

The ratio between compound (A1) and compound (B) selectively used in the present invention is presumed to fall within an appropriate range for improving the formulation stability of an amino acid-based agrochemical composition. Besides, interaction between compound (A1) and compound (B) accelerates permeation and movement of an amino acid-based agrochemical into and in plants, which probably effectively enhances the efficacy of the amino acid-based agrochemical.

The efficacy-enhancing agent composition for amino acid-based agrochemicals of the present invention contains compound (A1) represented by the above-described general formula (1-1).

In general formula (1-1), $R^1$ is a linear alkyl group having 1 or more and 4 or less carbon atoms, a linear alkenyl group having 2 or more and 4 or less carbon atoms, a branched alkyl group having 3 or more and 4 or less carbon atoms, or a branched alkenyl group having 3 or more and 4 or less carbon atoms. From the viewpoint of enhancing the efficacy of an agrochemical and the viewpoint of improving formulation stability of an agrochemical composition, $R^1$ is preferably a linear group. Besides, from the viewpoint of enhancing the efficacy of an agrochemical and the viewpoint of improving the formulation stability of an agrochemical composition, the carbon number of $R^1$ is preferably 1 or more and 3 or less, more preferably 1 or more and 2 or less, and further preferably 1. Considering these viewpoints comprehensively, $R^1$ is preferably a linear alkyl group having 1 or more and 3 or less carbon atoms, more preferably a linear alkyl group having 1 or more and 2 or less carbon atoms, and further preferably a linear alkyl group having 1 carbon atom.

Besides, in general formula (1-1), $R^2$ is a linear or branched alkyl group or alkenyl group having 5 or more and 17 or less carbon atoms. From the viewpoint of enhancing the efficacy of an agrochemical and the viewpoint of improving the formulation stability of an agrochemical composition, $R^2$ is preferably a linear group. Furthermore, from the viewpoint of enhancing the efficacy of an agrochemical and the viewpoint of improving the formulation stability of an agrochemical composition, $R^2$ is preferably an alkyl group. Besides, from the viewpoint of enhancing the efficacy of an agrochemical and the viewpoint of improving the formulation stability of an agrochemical composition, the carbon number of $R^2$ is preferably 7 or more, and more preferably 9 or more, and from the same viewpoints, is preferably 15 or less, and more preferably 13 or less. Considering these viewpoints comprehensively, $R^2$ is preferably a linear alkyl group having 7 or more and 13 or less carbon atoms, and more preferably a linear alkyl group having 9 or more and 13 or less carbon atoms.

In general formula (1-1), each of l, m and n denotes an average number of moles of added $CH_2CH_2O$ group. A total of l, m and n [l+m+n] is 1 or more and 15 or less, and from the viewpoint of enhancing the efficacy of an agrochemical and the viewpoint of improving the formulation stability of an agrochemical composition, is preferably 2 or more, more preferably 3 or more, further preferably 4 or more, and further preferably 5 or more, and from the viewpoint of enhancing the efficacy of an agrochemical, is preferably 12 or less, more preferably 10 or less, further preferably 9 or less, further preferably 8 or less, and further preferably 7 or less.

In general formula (1-1), $X^-$ is a counter ion, and examples include halide ions such as $Cl^-$, $Br^-$ and $I^-$, and anions such as an alkyl sulfate anion, an alkylbenzenesulfonate anion and a fatty acid anion. From the viewpoint of enhancing the efficacy of an agrochemical and the viewpoint of improving the formulation stability of an agrochemical composition, $X^-$ is preferably a halide ion or an alkyl sulfate anion, more preferably an alkyl sulfate anion, further preferably a methyl sulfate anion or an ethyl sulfate anion, and further preferably a methyl sulfate anion.

In the efficacy-enhancing agent composition for amino acid-based agrochemicals of the present invention, from the viewpoint of enhancing the efficacy of an agrochemical and the viewpoint of improving the formulation stability of an agrochemical composition, a content of compound (A1) with respect to a total of contents of compound (A1), and compound (A2), compound (A3), compound (A4) and compound (B) described later is preferably 25% by mass or more, more preferably 35% by mass or more, further preferably 40% by mass or more, further preferably 45% by mass or more, and further preferably 48% by mass or more, and from the viewpoint of economic efficiency, is preferably 60% by mass or less, more preferably 55% by mass or less, further preferably 54% by mass or less, and further preferably 53% by mass or less. This content (in % by mass) is calculated in accordance with [content of compound (A1)]/[sum of content of compound (A1), content of compound (A2), compound (A3), compound (A4) and compound (B)]×100.

Besides, compound (A1) represented by general formula (1-1) can be obtained by a production method selected from the following production methods 1 to 3:

Production method 1: A compound represented by general formula (1-5) (hereinafter also referred to as a triethanolamine EO adduct) is reacted with a fatty acid satisfying the condition for the carbon number of $R^2$ for esterification, and the resultant is further quaternized.

Production method 2: An oil or fat containing a fatty acid portion satisfying the condition for the carbon number of $R^2$ and a triethanolamine EO adduct are mixed in an optional ratio for transesterification, and the resultant is then further quaternized.

Production method 3: Triethanolamine, a fatty acid satisfying the condition for the carbon number of $R^2$, and ethylene oxide are reacted simultaneously with one another, and the resultant is further quaternized.

[Formula 4]

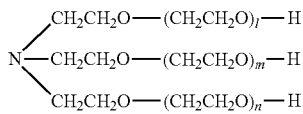

(1-5)

wherein, each of l, m and n denotes an average number of moles of added $CH_2CH_2O$ group, a total of l, m and n [l+m+n] being 1 or more and 15 or less.

In general formula (1-5), a preferable aspect of l, m and n is the same as that of l, m and n of general formula (1-1).

From the viewpoint of enhancing the efficacy of an agrochemical and the viewpoint of improving the formulation stability of an agrochemical composition, production method 1 and production method 2 are preferred, and production method 1 is more preferred among production methods 1 to 3.

In general, when these methods are employed, a reaction product is obtained not only as compound (A1) but also as a mixture containing compound (A2) represented by the following general formula (1-2) and compound (A3) represented by the following general formula (1-3), or as a mixture further containing compound (A4) represented by the following general formula (1-4). The efficacy-enhancing agent composition for amino acid-based agrochemicals of the present invention can optionally contain compound (A4) represented by the following general formula (1-4).

A ratio among compound (A1), compound (A2), compound (A3) and compound (A4) in the mixture can be adjusted in accordance with a molar ratio between the triethanolamine EO adduct and the fatty acid, a molar ratio between the triethanolamine EO adduct and the oil or fat, a molar ratio among the triethanolamine, the fatty acid and the ethylene oxide, a reaction temperature, a reaction time and the like. In general, when a molar ratio of the fatty acid or the oil or fat to the triethanolamine EO adduct, or a molar ratio of the fatty acid to the triethanolamine is low, the ratio of compound (A1) in the resultant mixture tends to be high. An example of a method for increasing the ratio of compound (A1) in the resultant mixture includes a method in which the molar ratio of fatty acid/triethanolamine EO adduct is set to preferably 0.3/1 or more and 1.1/1 or less, more preferably 0.4/1 or more and 1/1 or less, further preferably 0.4/1 or more and 0.8/1 or less, and further preferably 0.5/1 or more and 0.7/1 or less. If an oil or fat is used, the adjustment may be made so that a fatty acid portion satisfies the above-described molar ratio. From the viewpoint of balance between the effects and the economic efficiency, a mixture containing compound (A1), and a compound selected from compounds (A2), (A3) and (A4) can be used for preparing the efficacy-enhancing agent composition for amino acid-based agrochemicals of the present invention. Therefore, the efficacy-enhancing agent composition for amino acid-based agrochemicals of the present invention can contain compound (A1) represented by the above-described general formula (1-1), and one or more compounds selected from compound (A2) represented by the following general formula (1-2), compound (A3) represented by the following general formula (1-3), and compound (A4) represented by the following general formula (1-4). It is, however, necessary that a mass ratio of [content of compound (A3)]/[sum of content of compound (A1) and content of compound (A2)] and a mass ratio of [content of compound (A2)]/[content of compound (A1)] fall within prescribed ranges of the present invention.

Hereinafter, compounds (A1), (A2), (A3) and (A4) are sometimes designated collectively as compound (A).

Compound (A) contains at least compound (A1). The efficacy-enhancing agent composition for amino acid-based agrochemicals of the present invention can contain one or more of each of compound (A2), compound (A3) and compound (A4).

[Formula 5]

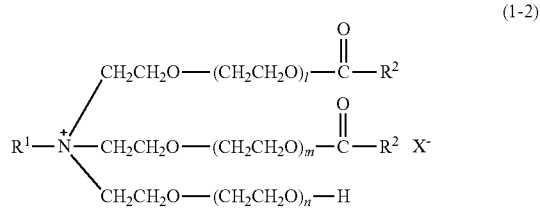

(1-2)

-continued

[Formula 6]

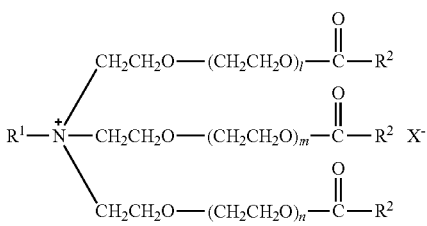
(1-3)

[Formula 7]

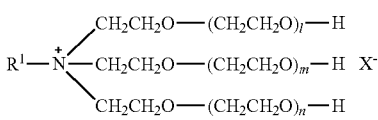
(1-4)

In general formula (1-2), general formula (1-3) and general formula (1-4), $R^1$ denotes a linear alkyl group having 1 or more and 4 or less carbon atoms, a linear alkenyl group having 2 or more and 4 or less carbon atoms, a branched alkyl group having 3 or more and 4 or less carbon atoms, or a branched alkenyl group having 3 or more and 4 or less carbon atoms;

$R^2$ denotes a linear or branched alkyl group or alkenyl group having 5 or more and 17 or less carbon atoms; each of l, m and n denotes an average number of moles of added $CH_2CH_2O$ group, a total of l, m and n [l+m+n] being 1 or more and 15 or less; and $X^-$ denotes a counter ion.

In general formula (1-2), general formula (1-3) and general formula (1-4), a preferable aspect of $R^1$ is the same as that of $R^1$ in general formula (1-1).

Besides, in general formula (1-2) and general formula (1-3), a preferable aspect of $R^2$ is the same as that of $R^2$ in general formula (1-1). It is noted that $R^2$ may be the same or different in general formula (1-2) and general formula (1-3).

Further, in general formula (1-2), general formula (1-3) and general formula (1-4), preferable aspects of l, m and n are the same as those of l, m and n in general formula (1-1).

Furthermore, in general formula (1-2), general formula (1-3) and general formula (1-4), $X^-$ is a counter ion, and a preferable aspect of $X^-$ is the same as that of $X^-$ in general formula (1-1).

From the viewpoint of enhancing the efficacy of an agrochemical, the viewpoint of improving the formulation stability of an agrochemical composition and the viewpoint of the economic efficiency, in the efficacy-enhancing agent composition for amino acid-based agrochemicals of the present invention, the mass ratio of the content of compound (A3) to the sum of the content of compound (A1) and the content of compound (A2), [content of compound (A3)]/[sum of content of compound (A1) and content of compound (A2)], is 0/100 or more and 9/91 or less. From the viewpoint of the economic efficiency, the mass ratio of [content of compound (A3)]/[sum of content of compound (A1) and content of compound (A2)] is preferably 1/99 or more, more preferably 2/98 or more, further preferably 3/97 or more, and further preferably 4/96 or more, and from the viewpoint of enhancing the efficacy of an agrochemical and the viewpoint of improving the formulation stability of an agrochemical composition, is preferably 8/92 or less, more preferably 7/93 or less, further preferably 6/94 or less, and further preferably 5/95 or less.

From the viewpoint of enhancing the efficacy of an agrochemical, the viewpoint of improving the formulation stability of an agrochemical composition and the viewpoint of the economic efficiency, in the efficacy-enhancing agent composition for amino acid-based agrochemicals of the present invention, the mass ratio of the content of compound (A2) to the content of compound (A1), [content of compound (A2)]/[content of compound (A1)], is 0/100 or more and 60/40 or less. From the viewpoint of the economic efficiency, the mass ratio of [content of compound (A2)]/[content of compound (A1)] is preferably 5/95 or more, more preferably 10/90 or more, further preferably 15/85 or more, further preferably 20/80 or more, and further preferably 25/75 or more, and from the viewpoint of enhancing the efficacy of an agrochemical and the viewpoint of improving the formulation stability of an agrochemical composition, is preferably 55/45 or less, more preferably 50/50 or less, further preferably 45/55 or less, further preferably 40/60 or less, and further preferably 35/65 or less.

The efficacy-enhancing agent composition for amino acid-based agrochemicals of the present invention may contain compound (A2) as long as the effects of the present invention are not impaired. In the efficacy-enhancing agent composition for amino acid-based agrochemicals of the present invention, from the viewpoint of the balance between the effects and the economic efficiency, the content of compound (A2) with respect to a total of respective contents of compound (A1), compound (A2), compound (A3), compound (A4) and compound (B) is preferably 1% by mass or more, more preferably 10% by mass or more, further preferably 15% by mass or more, further preferably 19% by mass or more, and further preferably 19.5% by mass or more, and from the viewpoint of not deteriorating the effects of the present invention, is preferably 30% by mass or less, more preferably 25% by mass or less, further preferably 23% by mass or less, and further preferably 22% by mass or less. This content (in % by mass) is calculated in accordance with [content of compound (A2)]/[sum of content of compound (A1), content of compound (A2), compound (A3), compound (A4) and compound (B)]×100.

The efficacy-enhancing agent composition for amino acid-based agrochemicals of the present invention may contain compound (A3) as long as the effects of the present invention are not impaired. In the efficacy-enhancing agent composition for amino acid-based agrochemicals of the present invention, from the viewpoint of the balance between the effects and the economic efficiency, the content of compound (A3) with respect to a total of respective contents of compound (A1), compound (A2), compound (A3), compound (A4) and compound (B) is preferably 1.0% by mass or more, more preferably 2.0% by mass or more, further preferably 2.5% by mass or more, further preferably 2.8% by mass or more, and from the viewpoint of not deteriorating the effects of the present invention, is preferably 5% by mass or less, more preferably 4.0% by mass or less, further preferably 3.5% by mass or less, further preferably 3.3% by mass or less, and further preferably 3.1% by mass or less. This content (in % by mass) is calculated in accordance with [content of compound (A3)]/[sum of content of compound (A1), content of compound (A2), compound (A3), compound (A4) and compound (B)]×100.

The efficacy-enhancing agent composition for amino acid-based agrochemicals of the present invention may contain compound (A4) as long as the effects of the present invention are not impaired. In the efficacy-enhancing agent composition for amino acid-based agrochemicals of the present invention, from the viewpoint of the balance between the effects and the economic efficiency, the content of compound (A4) with respect to a total of respective contents of compound (A1), compound (A2), compound (A3), compound (A4) and compound (B) is preferably 1% by mass or more, more preferably 10% by mass or more, further preferably 15% by mass or more, further preferably 20% by mass or more, and further preferably 22% by mass or more, and from the viewpoint of not deteriorating the effects of the present invention, is preferably 35% by mass or less, more preferably 30% by mass or less, further preferably 28% by mass or less, and further preferably 26% by mass or less. This content (in % by mass) is calculated in accordance with [content of compound (A4)]/[sum of content of compound (A1), content of compound (A2), compound (A3), compound (A4) and compound (B)]×100.

From the viewpoint of enhancing the efficacy of an agrochemical, the viewpoint of improving the formulation stability of an agrochemical composition and the viewpoint of the economic efficiency, in the efficacy-enhancing agent composition for amino acid-based agrochemicals of the present invention, the mass ratio of the content of compound (A4) to a sum of the content of compound (A1) and the content of compound (A2), [content of compound (A4)]/[sum of content of compound (A1) and content of compound (A2)], is preferably 0/100 or more and 70/30 or less. From the viewpoint of the economic efficiency, the mass ratio of [content of compound (A4)]/[sum of content of compound (A1) and content of compound (A2)] is preferably 10/90 or more, more preferably 15/85 or more, further preferably 20/80 or more, further preferably 22/78 or more, and further preferably 23/77 or more, and from the viewpoint of enhancing the efficacy of an agrochemical and the viewpoint of improving the formulation stability of an agrochemical composition, is preferably 60/40 or less, more preferably 50/50 or less, further preferably 40/60 or less, and further preferably 30/70 or less.

From the viewpoint of enhancing the efficacy of an agrochemical, the viewpoint of improving the formulation stability of an agrochemical composition and the viewpoint of the economic efficiency, in the efficacy-enhancing agent composition for amino acid-based agrochemicals of the present invention, the mass ratio of the content of compound (A4) to a sum of the content of compound (A1), the content of compound (A2) and the content of compound (A3), [content of compound (A4)]/[sum of content of compound (A1), content of compound (A2) and content of compound (A3)], is preferably 0/100 or more and 70/30 or less. From the viewpoint of the economic efficiency, the mass ratio of [content of compound (A4)]/[sum of content of compound (A1), content of compound (A2) and content of compound (A3)] is preferably 10/90 or more, more preferably 15/85 or more, further preferably 20/80 or more, further preferably 22/78 or more, and further preferably 23/77 or more, and from the viewpoint of enhancing the efficacy of an agrochemical and the viewpoint of improving the formulation stability of an agrochemical composition, is preferably 60/40 or less, more preferably 50/50 or less, further preferably 40/60 or less, and further preferably 30/70 or less.

In the present invention, from the viewpoint of enhancing the efficacy of an agrochemical and the viewpoint of improving the formulation stability of an agrochemical composition, the content of compound (A1) with respect to a total of respective contents of compound (A1), compound (A2), compound (A3) and compound (A4), namely, the content of compound (A), is preferably 40% by mass or more, more preferably 42% by mass or more, further preferably 45% by mass or more, further preferably 48% by mass or more, and further preferably 50% by mass or more, and from the viewpoint of the economic efficiency, is preferably 100% by mass or less, more preferably 80% by mass or less, further preferably 70% by mass or less, further preferably 60% by mass or less, further preferably 55% by mass or less, and further preferably 53% by mass or less. This content (in % by mass) is calculated in accordance with [content of compound (A1)]/[sum of content of compound (A1), content of compound (A2), compound (A3) and compound (A4)]×100.

The efficacy-enhancing agent composition for amino acid-based agrochemicals of the present invention contains compound (B) represented by the above-described general formula (2).

In general formula (2), $R^3$ is a linear or branched alkyl group or alkenyl group having 5 or more and 17 or less carbon atoms. From the viewpoint of enhancing the efficacy of an agrochemical and the viewpoint of excellent formulation stability of an agrochemical composition, $R^3$ is preferably a linear group. Furthermore, from the viewpoint of enhancing the efficacy of an agrochemical and the viewpoint of excellent formulation stability of an agrochemical composition, $R^3$ is preferably an alkyl group. Besides, from the viewpoint of enhancing the efficacy of an agrochemical and the viewpoint of excellent formulation stability of an agrochemical composition, the carbon number of $R^3$ is preferably 7 or more, and more preferably 9 or more, and from the same viewpoints, is preferably 15 or less, and more preferably 13 or less. Considering these viewpoints comprehensively, $R^3$ is preferably a linear alkyl group having 7 or more and 13 or less carbon atoms, and more preferably a linear alkyl group having 9 or more and 13 or less carbon atoms.

From the viewpoint of enhancing the efficacy of an agrochemical and the viewpoint of excellent formulation stability of an agrochemical composition, in the efficacy-enhancing agent composition for amino acid-based agrochemicals of the present invention, the mass ratio of the content of compound (B) to the content of compound (A1), [content of compound (B)]/[content of compound (A1)], is 1/500 or more and 1/5.2 or less. From the viewpoint of enhancing the efficacy of an agrochemical and the viewpoint of productivity of the efficacy-enhancing agent composition for amino acid-based agrochemicals, the mass ratio of [content of compound (B)]/[content of compound (A1)] is preferably 1/103 or more, more preferably 1/100 or more, further preferably 1/60 or more, and further preferably 1/50 or more, and from the viewpoint of enhancing the efficacy of an agrochemical, is furthermore preferably 1/31 or more, furthermore preferably 1/20 or more, furthermore preferably 1/10 or more, and furthermore preferably 1/8 or more. In addition, from the viewpoint of enhancing the efficacy of an agrochemical and the viewpoint of the productivity of the efficacy-enhancing agent composition for amino acid-based agrochemicals, the mass ratio of [content of compound (B)]/[content of compound (A1)] is preferably 1/5.5 or less, more preferably 1/6.0 or less, and further preferably 1/6.2 or less. Besides, from the viewpoint of excellent formulation stability of an agrochemical composition, the mass ratio of [content of compound (B)]/[content of compound (A1)] is preferably 1/5.5 or less, more preferably 1/6.0 or less, further preferably 1/6.2 or less, furthermore preferably 1/15 or less, furthermore preferably 1/20 or less, furthermore preferably 1/25 or less, furthermore preferably 1/31 or less, furthermore preferably 1/50 or less, furthermore preferably 1/60 or less, and furthermore preferably 1/100 or less.

From the viewpoint of enhancing the efficacy of an agrochemical and the viewpoint of excellent formulation stability of an agrochemical composition, in the efficacy-enhancing agent composition for amino acid-based agrochemicals of the present invention, the mass ratio of the content of compound (B) to the content of compound (A), [content of compound (B)]/[content of compound (A)], is 1/950 or more and 1/10 or less. From the viewpoint of enhancing the efficacy of an agrochemical and the viewpoint of the productivity of the efficacy-enhancing agent composition for amino acid-based agrochemicals, the mass ratio of the content of compound (B) to the content of compound (A), [content of compound (B)]/[content of compound (A)], is preferably 1/200 or more, more preferably 1/150 or more, further preferably 1/100 or more, and furthermore preferably 1/90 or more, and from the viewpoint of enhancing the efficacy of an agrochemical, is further preferably 1/58 or more, furthermore preferably 1/40 or more, furthermore preferably 1/20 or more, and furthermore preferably 1/16 or more. In addition, from the viewpoint of enhancing the efficacy of an agrochemical and the viewpoint of the productivity of the efficacy-enhancing agent composition for amino acid-based agrochemicals, the mass ratio of the content of compound (B) to the content of compound (A), [content of compound (B)]/[content of compound (A)], is preferably 1/11 or less, more preferably 1/11.5 or less, and further preferably 1/12 or less. Besides, from the viewpoint of excellent formulation stability of an agrochemical composition, the mass ratio of the content of compound (B) to the content of compound (A), [content of compound (B)]/[content of compound (A)], is preferably 1/11 or less, more preferably 1/11.5 or less, further preferably 1/12 or less, furthermore preferably 1/20 or less, furthermore preferably 1/40 or less, furthermore preferably 1/50 or less, furthermore preferably 1/58 or less, furthermore preferably 1/90 or less, furthermore preferably 1/100 or less, furthermore preferably 1/150 or less, and furthermore preferably 1/200 or less. Here, the content of compound (A) refers to the sum of the content of compound (A1), the content of compound (A2), the content of compound (A3) and the content of compound (A4), and this mass ratio is also a mass ratio of [content of compound (B)]/[sum of content of compound (A1), content of compound (A2), content of compound (A3) and content of compound (A4)].

From the viewpoint of enhancing the efficacy of an agrochemical and the viewpoint of the productivity of the efficacy-enhancing agent composition for amino acid-based agrochemicals, in the efficacy-enhancing agent composition for amino acid-based agrochemicals of the present invention, the content of compound (B) with respect to the total of the contents of compound (A1), compound (A2), compound (A3), compound (A4) and compound (B) is preferably 0.1% by mass or more, more preferably 0.5% by mass or more, further preferably 0.8% by mass or more, and furthermore preferably 1.0% by mass or more, and from the viewpoint of enhancing the efficacy of an agrochemical, is furthermore preferably 3% by mass or more, furthermore preferably 4% by mass or more, furthermore preferably 5% by mass or more, and furthermore preferably 6% by mass or more. In addition, from the viewpoint of enhancing the efficacy of an agrochemical and the viewpoint of the productivity of the efficacy-enhancing agent composition for amino acid-based agrochemicals, the content of compound (B) with respect to the total of the contents of compound (A1), compound (A2), compound (A3), compound (A4) and compound (B) is preferably 9.0% by mass or less, more preferably 8.5% by mass or less, and further preferably 8.0% by mass or less. Besides, from the viewpoint of excellent formulation stability of an agrochemical composition, the content of compound (B) with respect to the total of the contents of compound (A1), compound (A2), compound (A3), compound (A4) and compound (B) is preferably 0.1% by mass or more, and preferably 9.0% by mass or less, more preferably 8.5% by mass or less, further preferably 8.0% by mass or less, furthermore preferably 6% by mass or less, furthermore preferably 4% by mass or less, furthermore preferably 2.5% by mass or less, furthermore preferably 2.0% by mass or less, furthermore preferably 1.0% by mass or less, furthermore preferably 0.8% by mass or less, and furthermore preferably 0.5% by mass or less. This content (in % by mass) is calculated in accordance with [content of compound (B)]/[sum of content of compound (A1), content of compound (A2), compound (A3), compound (A4) and compound (B)]×100.

The efficacy-enhancing agent composition for amino acid-based agrochemicals of the present invention can contain compound (B) or compound (C) described in JP-A 2015-077836.

The efficacy-enhancing agent composition for amino acid-based agrochemicals of the present invention is preferably a liquid composition from the viewpoint of handleability. If the mixture of compound (A) and compound (B) is not a liquid composition, or if the mixture is difficult to handle because of, for example, high viscosity even though it is a liquid composition, one or more selected from water and hydrophilic solvents are preferably contained.

Any of tap water, distilled water, ion exchange water and the like can be used as the water as long as the effects of the efficacy-enhancing agent composition for amino acid-based agrochemicals of the present invention are not impaired, and from the viewpoint of stability, the water is preferably ion exchange water.

Examples of the hydrophilic solvents include monohydric alcohols such as methanol, ethanol and propanol, and diols such as ethylene glycol, diethylene glycol, polyethylene glycol, propylene glycol and dipropylene glycol.

When the efficacy-enhancing agent composition for amino acid-based agrochemicals of the present invention contains water and/or a hydrophilic solvent, a content of the water and/or the hydrophilic solvent in the composition is preferably 5% by mass or more, more preferably 15% by mass or more, and further preferably 25% by mass or more from the viewpoint of the handleability, and is preferably 50% by mass or less, more preferably 40% by mass or less, and further preferably 35% by mass or less from the viewpoint of the economic efficiency such as transportation cost.

The efficacy-enhancing agent composition for amino acid-based agrochemicals of the present invention can optionally contain a compound other than these components, such as a compound used as an oil or a surfactant.

The efficacy-enhancing agent composition for amino acid-based agrochemicals of the present invention can be produced, for example, by mixing compound (A) and compound (B), an optional component if necessary, and water, and stirring the resultant mixture. Besides, the respective components may be mixed by adding the components all together, or separately adding the components, and if the components are separately added, the order of adding the components is disregarded.

One aspect of the present invention is an efficacy-enhancing agent composition for amino acid-based agrochemicals, containing compound (A1), compound (B), and optionally compound (A2), and optionally compound (A3), and optionally compound (A4), wherein a mass ratio of the content of compound (A3) to a sum of the content of compound (A1) and the content of compound (A2), [content of compound (A3)]/[sum of content of compound (A1) and content of compound (A2)], is 0/100 or more and 9/91 or less;

a mass ratio of the content of compound (A2) to the content of compound (A1), [content of compound (A2)]/[content of compound (A1)], is 0/100 or more and 60/40 or less;

a mass ratio of the content of compound (A4) to a sum of the content of compound (A1) and the content of compound (A2), [content of compound (A4)]/[sum of content of compound (A1) and content of compound (A2)], is 0/100 or more and 70/30 or less; and a mass ratio of the content of compound (B) to the content of compound (A1), [content of compound (B)]/[content of compound (A1)], is 1/500 or more and 1/5.2 or less.

Another aspect of the present invention is an efficacy-enhancing agent composition for amino acid-based agrochemicals, containing compound (A1), compound (B), and at least one compound selected form compound (A2), compound (A3) and compound (A4), wherein a mass ratio of the content of compound (A3) to a sum of the content of compound (A1) and the content of compound (A2), [content of compound (A3)]/[sum of content of compound (A1) and content of compound (A2)], is 0/100 or more and 9/91 or less;

a mass ratio of the content of compound (A2) to the content of compound (A1), [content of compound (A2)]/[content of compound (A1)], is 0/100 or more and 60/40 or less; and a mass ratio of the content of compound (B) to the content of compound (A1), [content of compound (B)]/[content of compound (A1)], is 1/500 or more and 1/5.2 or less.

Still another aspect of the present invention is an efficacy-enhancing agent composition for amino acid-based agrochemicals, containing compound (A1), compound (A2), compound (A3), compound (A4) and compound (B), wherein a mass ratio of the content of compound (A3) to a sum of the content of compound (A1) and the content of compound (A2), [content of compound (A3)]/[sum of content of compound (A1) and content of compound (A2)], is 1/99 or more and 9/91 or less;

a mass ratio of the content of compound (A2) to the content of compound (A1), [content of compound (A2)]/[content of compound (A1)], is 5/95 or more and 60/40 or less; and a mass ratio of the content of compound (B) to the content of compound (A1), [content of compound (B)]/[content of compound (A1)], is 1/500 or more and 1/5.2 or less.

Still another aspect of the present invention is an efficacy-enhancing agent composition for amino acid-based agrochemicals, containing compound (A1), compound (A2), compound (A3), compound (A4) and compound (B), wherein a mass ratio of the content of compound (A3) to a sum of the content of compound (A1) and the content of compound (A2), [content of compound (A3)]/[sum of content of compound (A1) and content of compound (A2)], is 1/99 or more and 9/91 or less;

a mass ratio of the content of compound (A2) to the content of compound (A1), [content of compound (A2)]/[content of compound (A1)], is 5/95 or more and 60/40 or less;

a mass ratio of the content of compound (A4) to a sum of the content of compound (A1) and the content of compound (A2), [content of compound (A4)]/[sum of content of compound (A1) and content of compound (A2)], is 10/90 or more and 70/30 or less; and a mass ratio of the content of compound (B) to the content of compound (A1), [content of compound (B)]/[content of compound (A1)], is 1/500 or more and 1/5.2 or less.

Still another aspect of the present invention is an efficacy-enhancing agent composition for amino acid-based agrochemicals, containing a quaternized product of a reaction product between a triethanolamine EO adduct and a fatty acid having 6 or more and 18 or less carbon atoms, and compound (B).

Still another aspect of the present invention is an efficacy-enhancing agent composition for amino acid-based agrochemicals containing a quaternized product of a reaction product between a triethanolamine EO adduct and a fatty acid having 6 or more and 18 or less carbon atoms, and compound (B), wherein the quaternized product contains compound (A1) and compound (B).

Still another aspect of the present invention is an efficacy-enhancing agent composition for amino acid-based agrochemicals containing a quaternized product of a reaction product between a triethanolamine EO adduct and a fatty acid having 6 or more and 18 or less carbon atoms, and compound (B), wherein the quaternized product contains compound (A1), compound (A2), compound (A3), compound (A4) and compound (B);

a mass ratio of the content of compound (A3) to a sum of the content of compound (A1) and the content of compound (A2), [content of compound (A3)]/[sum of content of compound (A1) and content of compound (A2)], is 1/99 or more and 10/90 or less;

a mass ratio of the content of compound (A2) to the content of compound (A1), [content of compound (A2)]/[content of compound (A1)], is 5/95 or more and 60/40 or less; and a mass ratio of the content of compound (B) to the content of compound (A1), [content of compound (B)]/[content of compound (A1)], is 1/500 or more and 1/5.2 or less.

In all of these aspects, the preferable matters described above can be applied.

<Agrochemical Composition>

An agrochemical composition of the present invention contains compound (A1) represented by the above-described general formula (1-1), compound (B) represented by the above-described general formula (2), amino acid-based agrochemical active ingredient (C) and water, and optionally compound (A2) represented by the above-described general formula (1-2), and optionally compound (A3) represented by the above-described general formula (1-3), wherein a mass ratio of the content of compound (A3) to a sum of the content of compound (A1) and the content of compound (A2), [content of compound (A3)]/[sum of content of compound (A1) and content of compound (A2)], is 0/100 or more and 9/91 or less;

a mass ratio of the content of compound (A2) to the content of compound (A1), [content of compound (A2)]/[content of compound (A1)], is 0/100 or more and 60/40 or less; and a mass ratio of the content of compound (B) to the content of compound (A1), [content of compound (B)]/[content of compound (A1)], is 1/500 or more and 1/5.2 or less.

The agrochemical composition of the present invention preferably contains the efficacy-enhancing agent composition for amino acid-based agrochemicals of the present invention, amino acid-based agrochemical active ingredient (C) and water. In other words, the agrochemical composition of the present invention is preferably produced by mixing the efficacy-enhancing agent composition for amino acid-based agrochemicals of the present invention, amino acid-based agrochemical active ingredient (C) and water.

Besides, preferable aspects of the agrochemical composition of the present invention, namely, the structure of compound (A), the structure of compound (B), the production method for compound (A), each content of compound (A1), compound (A2), compound (A3), compound (A4) and compound (B) with respect to the total of the respective contents of these compounds, each content of compound (A1), compound (A2), compound (A3) and compound (A4) with respect to the total of the respective contents of these compounds, the mass ratio of [content of compound (A3)]/[sum of content of compound (A1) and content of compound (A2)], the mass ratio of [content of compound (A2)]/[content of compound (A1)], the mass ratio of [content of compound (A4)]/[sum of content of compound (A1) and content of compound (A2)], the mass ratio of [content of compound (A4)]/[sum of content of compound (A1), content of compound (A2) and content of compound (A3)], the mass ratio of [content of compound (B)]/[content of compound (A1)], the mass ratio of [content of compound (B)]/[content of compound (A)], and the like, are the same as those described above as the preferable aspects with respect to the efficacy-enhancing agent composition for amino acid-based agrochemicals.

An example of amino acid-based agrochemical active ingredient (C) includes an agrochemical active ingredient (active component) of an amino acid-based herbicide. Examples of the agrochemical active ingredient (active component) of an amino acid-based herbicide include glyphosate [N-(phosphonomethyl)glycine or a salt thereof], bialaphos [sodium salt of L-2-amino-4-[(hydroxy)(methyl) phosphinoyl]butyryl-L-alanyl-L-alanine] and glufosinate [ammonium-DL-homoalanine-4-yl(methyl)phosphinate], and from the viewpoint of enhancing the efficacy of an agrochemical and the viewpoint of excellent formulation stability of the agrochemical composition, glyphosate [N-(phosphonomethyl)glycine or a salt thereof] or glufosinate [ammonium-DL-homoalanine-4-yl(methyl)phosphinate] is preferred, and glyphosate [N-(phosphonomethyl)glycine or a salt thereof] is more preferred. Such a component may be an agriculturally acceptable salt. Besides, when blended in the agrochemical composition, such a component may be used in the form of an aqueous solution, a liquid, a wettable powder or the like containing the component.

The agrochemical composition of the present invention contains amino acid-based agrochemical active ingredient (C) in an amount of preferably 10% by mass or more, more preferably 20% by mass or more, further preferably 30% by mass or more, and furthermore preferably 35% by mass or more from the viewpoint of the economic efficiency such as the transportation cost, and in an amount of preferably 70% by mass or less, more preferably 60% by mass or less, further preferably 50% by mass or less, and furthermore preferably 45% by mass or less from the viewpoint of the formulation stability of the agrochemical composition.

The preferable structures of compound (A1), compound (A2), compound (A3), compound (A4) and compound (B) and the mass ratios among their contents in the agrochemical composition of the present invention can be selected from the matters described above with respect to the efficacy-enhancing agent composition for amino acid-based agrochemicals of the present invention.

The agrochemical composition of the present invention contains compound (A1) in an amount of preferably 2% by mass or more, more preferably 3% by mass or more, further preferably 3.2% by mass or more, furthermore preferably 3.4% by mass or more, and furthermore preferably 3.6% by mass or more from the viewpoint of enhancing the efficacy of an agrochemical and the viewpoint of excellent formulation stability of the agrochemical composition, and in an amount of preferably 10% by mass or less, more preferably 8% by mass or less, further preferably 6% by mass or less, furthermore preferably 5.0% by mass or less, furthermore preferably 4.5% by mass or less, and furthermore preferably 4.0% by mass or less from the viewpoint of the economic efficiency.

The agrochemical composition of the present invention can contain compound (A2) as long as the effects of the present invention are not impaired. The agrochemical composition of the present invention contains compound (A2) in an amount of preferably 0.5% by mass or more, more preferably 1.0% by mass or more, further preferably 1.2% by mass or more, furthermore preferably 1.4% by mass or more, and furthermore preferably 1.5% by mass or more from the viewpoint of the balance between the effects and the economic efficiency, and in an amount of preferably 5.0% by mass or less, more preferably 3.0% by mass or less, further preferably 2.5% by mass or less, furthermore preferably 2.0% by mass or less, and furthermore preferably 1.7% by mass or less from the viewpoint of not deteriorating the effects of the present invention.

The agrochemical composition of the present invention can contain compound (A3) as long as the effects of the present invention are not impaired. The agrochemical composition of the present invention contains compound (A3) in an amount of preferably 0.05% by mass or more, more preferably 0.10% by mass or more, further preferably 0.15% by mass or more, and furthermore preferably 0.20% by mass or more from the viewpoint of the balance between the effects and the economic efficiency, and in an amount of preferably 1.0% by mass or less, more preferably 0.6% by mass or less, further preferably 0.5% by mass or less, furthermore preferably 0.4% by mass or less, and furthermore preferably 0.3% by mass or less from the viewpoint of not deteriorating the effects of the present invention.

The agrochemical composition of the present invention can contain compound (A4) as long as the effects of the present invention are not impaired. The agrochemical composition of the present invention contains compound (A4) in an amount of preferably 0.5% by mass or more, more preferably 1.0% by mass or more, further preferably 1.2% by mass or more, furthermore preferably 1.4% by mass or more, and furthermore preferably 1.6% by mass or more from the viewpoint of the balance between the effects and the economic efficiency, and in an amount of preferably 5.0% by mass or less, more preferably 3.0% by mass or less, further preferably 2.4% by mass or less, and furthermore preferably 2.0% by mass or less from the viewpoint of not deteriorating the effects of the present invention.

The agrochemical composition of the present invention contains compound (B) in an amount of preferably 0.01% by mass or more, more preferably 0.05% by mass or more, further preferably 0.08% by mass or more, furthermore preferably 0.09% by mass or more, and furthermore preferably 0.11% by mass or more from the viewpoint of enhancing the efficacy of an agrochemical and the viewpoint of excellent formulation stability of the agrochemical composition, in an amount of furthermore preferably 0.30% by mass or more, furthermore preferably 0.45% by mass or more, and furthermore preferably 0.50% by mass or more from the viewpoint of enhancing the efficacy of an agrochemical, and in an amount of preferably 0.7% by mass or less, more preferably 0.65% by mass or less, and further preferably 0.60% by mass or less from the viewpoint of enhancing the efficacy of an agrochemical and the viewpoint of the economic efficiency. Besides, the agrochemical composition of the present invention contains compound (B) in an amount of preferably 0.7% by mass or less, more preferably 0.65% by mass or less, further preferably 0.60% by mass or less, furthermore preferably 0.30% by mass or less, furthermore preferably 0.20% by mass or less, furthermore preferably 0.15% by mass or less, furthermore preferably 0.11% by mass or less, furthermore preferably 0.09% by mass or less, furthermore preferably 0.08% by mass or less, and furthermore preferably 0.05% by mass or less from the viewpoint of excellent formulation stability of the agrochemical composition.

The agrochemical composition of the present invention contains water from the viewpoint of the handleability. The agrochemical composition is preferably a liquid composition containing water. The agrochemical composition of the present invention contains water in an amount of preferably 20% by mass or more, more preferably 30% by mass or more, further preferably 40% by mass or more, and furthermore preferably 45% by mass or more from the viewpoint of the handleability, and in an amount of preferably 70% by mass or less, more preferably 60% by mass or less, and further preferably 55% by mass or less from the viewpoint of the economic efficiency such as the transportation cost.

The agrochemical composition of the present invention may optionally contain a compound, such as a solvent (propylene glycol monomethyl ether or the like), a chelating agent, a pH adjusting agent, an inorganic salt or a thickener, in addition to compound (A), compound (B), amino acid-based agrochemical active ingredient (C) and water.

<Weeding Method>

In a weeding method of the present invention, an agrochemical spray solution prepared from the agrochemical composition of the present invention is sprayed on a plant.

In the weeding method of the present invention, a concentration of compound (A1) in the agrochemical spray solution may be selected from 30 ppm or more, 100 ppm or more, 120 ppm or more, 150 ppm or more, 170 ppm or more, and 200 ppm or more from the viewpoint of enhancing the efficacy of an agrochemical, and may be selected from 50000 ppm or less, 5000 ppm or less, 2000 ppm or less, 1000 ppm or less, 600 ppm or less, 500 ppm or less, and 400 ppm or less from the viewpoint of the economic efficiency.

In the weeding method of the present invention, a concentration of compound (B) in the agrochemical spray solution may be selected from 0.5 ppm or more, 1 ppm or more, 2 ppm or more, 3 ppm or more, 4 ppm or more, and 5 ppm or more from the viewpoint of enhancing the efficacy of an agrochemical, and may be selected from 150 ppm or less, 100 ppm or less, 40 ppm or less, 20 ppm or less, 10 ppm or less, and 8 ppm or less from the viewpoint of the economic efficiency.

Besides, in the weeding method of the present invention, the agrochemical spray solution is sprayed in a ratio of preferably 50 L/ha or more, more preferably 200 L/ha or more, further preferably 400 L/ha or more, and furthermore preferably 500 L/ha or more, and in a ratio of preferably 1000 L/ha or less, more preferably 800 L/ha or less, and further preferably 600 L/ha or less.

In the weeding method of the present invention, a prescribed spray solution is applied to a weed, that is, a target plant to be exterminated. In the agricultural field, weeds are recognized as herbs growing in and around cropland to harmfully affect crop production. Besides, in fields other than the agricultural field, weeds are recognized as herbs naturally growing not only in cropland but also in non-cropland, such as a road, a rail bed, an embankment, a plant site, a developed land, a grass site and a garden, to disturb the function of the land or to cause a problem in disaster prevention or landscape. In the present invention, all of these herbs are regarded as weeds. Weeds are classified as broad leaf weeds, gramineous weeds and the like. A broad leaf weed has reticulate veins differently from a weed having a linear leaf such as a gramineous weed or a weed having parallel veins.

Examples of the weeds to be exterminated by the weeding method of the present invention include broad leaf weeds. Examples of the broad leaf weeds include a morning glory (*Ipomoea nil*), a velvetleaf (*Abutilon theophrasti*), a Japanese bindweed (*Calystegia japonica*), a white clover (*Trifolium repens*), a dandelion (*Taraxacum*), a sorrel vine (*Cayratia japonica*), a tall goldenrod (*Solidago altissima*), a hairy fleabane (*Conyza bonariensis*), a large-leaved beggarticks (*Bidens frondosa*), Japanese knotweed (*Fallopia japonica*), a variable leaf yellowcress (*Rorrippa indica*), a creeping smartweed (*Persicaria longiseta*), a purple amaranth (*Amaranthus blitum*), a persian speedwell (*Veronica persica*), an Asiatic plantain (*Plantago asiatica*), a cocklebur (*Xanthium strumarium*), a ground ivy (*Glechoma hederacea* ssp. *grandis*), a yellow sorrel (*Oxalis corniculata*), a Japanese hop (*Humulus japonicus*), a galingale (*Cyperus microiria*), a narrow leaved vetch (*Vicia angustifolia*), a Japanese dock (*Rumex japonicus*), *Euphorbia pseudochamaesyce*, a creeping lettuce (*Lactuca stolonifera*), a white goosefoot (*Chenopodium album* var. *album.*), a bog yellowcress (*Rorippa islandica*), a field horsetail (*Equisetum arvense*), a common purslane (*Portulaca oleracea*), a dandelion (*Taraxacum officinale*), a plume poppy (*Macleaya cordata*), a dayflower (*Commelina communis*), a fishmint (*Houttuynia cordata*), a shepherd's purse (*Capsella bursa-pastoris*), a common sowthistle (*Sonchus oleraceus*), a groundsel (*Senecio vulgaris*), a greater stitchwort (*Stellaria alsine* var. *undulata*), a chickweed (*Stellaria media*), a cudweed (*Gnaphalium multiceps*), a coco grass (*Cyperus rotundus*), a Philadelphia fleabane (*Erigeron philadelphicus*), an eastern daisy fleabane (*Erigeron annuus*), a Canadian horseweed (*Erigeron canadensis*), a ragweed (*Ambrosia artemisiifolia* var. *elatior*), a henbit (*Lamium amplexicaule*), a false cleavers (*Galium spurium* var. *echinospermon*), a Japanese mugwort (*Artemisia prpinceps*) and a Carolina horsenettle (*Solanum carolinense*), and from the viewpoint of the efficacy of an agrochemical, the weed is preferably a morning glory or a velvetleaf.

Other examples of the weeds to be exterminated by the weeding method of the present invention include gramineous weeds. Examples of the gramineous weeds include a barnyard grass (*Echinochloa curs-galli*), a green foxtail (*Setaria viridis*), a yellow foxtail (*Setaria lutescens*), *Setaria viridis purpurascens*, an annual bluegrass (*Poa annua*), a shortawn foxtail (*Alopecurus aequalis*), a lovegrass (*Eragrostis multicaulis*), *Digitaria violascens*, a tropical fingergrass (*Digitaria ciliaris*), a bay grass (*Eragrostis ferruginea*), an orchard grass (*Dactylis glomerata*), an eulalia grass (*Miscanthus sinensis*), a japanese *paspalum* (*Paspalum thunbergii*), a cogon grass (*Imperata cylindrica* var. *koenigii*), a dwarf fountain grass (*Pennisetum alopecuroides*), a reed (*Phragmites communis*) and bamboo grasses (*Sasa*), and from the viewpoint of the efficacy of an agrochemical, the weed is preferably a barnyard grass.

The weeding method of the present invention may be applied to a weed selected from the broad leaf weeds and the gramineous weeds. Besides, the weeding method of the present invention may be applied to a weed selected from a barnyard grass, a morning glory and a velvetleaf. Furthermore, the weeding method of the present invention may be applied to a barnyard grass.

Now, various aspects of the present invention will be described. To these aspects, all the matters described above with respect to the efficacy-enhancing agent composition for amino acid-based agrochemicals, the agrochemical composition and the weeding method of the present invention can be applied.

<1>

An efficacy-enhancing agent composition for amino acid-based agrochemicals, containing compound (A1) represented by the following general formula (1-1), compound (B) represented by the following general formula (2), optionally compound (A2) represented by the following general formula (1-2), and optionally compound (A3) represented by the following general formula (1-3), wherein a mass ratio of a content of compound (A3) to a sum of a content of compound (A1) and a content of compound (A2), [content of compound (A3)]/[sum of content of compound (A1) and content of compound (A2)], is 0/100 or more and 9/91 or less;

a mass ratio of the content of compound (A2) to the content of compound (A1), [content of compound (A2)]/[content of compound (A1)], is 0/100 or more and 60/40 or less; and a mass ratio of a content of compound (B) to the content of compound (A1), [content of compound (B)]/[content of compound (A1)], is 1/500 or more and 1/5.2 or less:

[Formula 8]

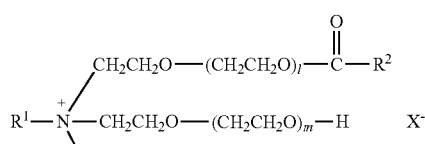

(1-1)

[Formula 9]

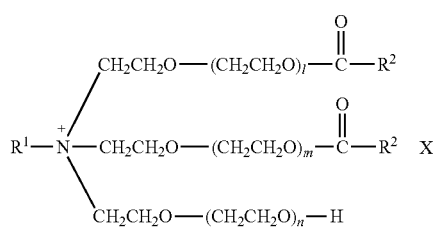

(1-2)

[Formula 10]

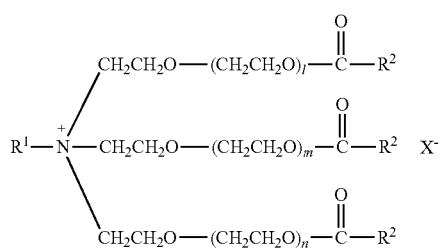

(1-3)

wherein $R^1$ denotes a linear alkyl group having 1 or more and 4 or less carbon atoms, a linear alkenyl group having 2 or more and 4 or less carbon atoms, a branched alkyl group having 3 or more and 4 or less carbon atoms, or a branched alkenyl group having 3 or more and 4 or less carbon atoms;

$R^2$ denotes a linear or branched alkyl group or alkenyl group having 5 or more and 17 or less carbon atoms; each of l, m and n denotes an average number of moles of added $CH_2CH_2O$ group, a total of l, m and n [l+m+n] being 1 or more and 15 or less; and $X^-$ denotes a counter ion; and

(2)

wherein $R^3$ denotes a linear or branched alkyl group or alkenyl group having 5 or more and 17 or less carbon atoms.

<2>

The efficacy-enhancing agent composition for amino acid-based agrochemicals described in <1>, optionally containing compound (A4) represented by the following general formula (1-4):

[Formula 11]

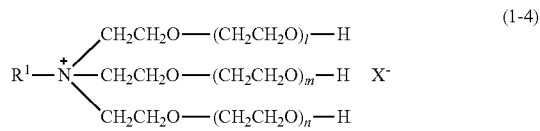

(1-4)

wherein $R^1$ denotes a linear alkyl group having 1 or more and 4 or less carbon atoms, a linear alkenyl group having 2 or more and 4 or less carbon atoms, a branched alkyl group having 3 or more and 4 or less carbon atoms, or a branched alkenyl group having 3 or more and 4 or less carbon atoms;

each of l, m and n denotes an average number of moles of added $CH_2CH_2O$ group, a total of l, m and n [l+m+n] being 1 or more and 15 or less; and $X^-$ denotes a counter ion.

<3>

An efficacy-enhancing agent composition for amino acid-based agrochemicals, containing compound (A1) represented by the following general formula (1-1), compound (B) represented by the following general formula (2), optionally compound (A2) represented by the following general formula (1-2), optionally compound (A3) represented by the following general formula (1-3), and optionally compound (A4) represented by the following general formula (1-4), wherein a mass ratio of a content of compound (A3) to a sum of a content of compound (A1) and a content of compound (A2), [content of compound (A3)]/[sum of content of compound (A1) and content of compound (A2)], is 0/100 or more and 9/91 or less;

a mass ratio of the content of compound (A2) to the content of compound (A1), [content of compound (A2)]/[content of compound (A1)], is 0/100 or more and 60/40 or less;

a mass ratio of a content of compound (A4) to a sum of the content of compound (A1) and the content of compound (A2), [content of compound (A4)]/[sum of content of compound (A1) and content of compound (A2)], is 0/100 or more and 70/30 or less; and a mass ratio of a content of compound (B) to the content of compound (A1), [content of compound (B)]/[content of compound (A1)], is 1/500 or more and 1/5.2 or less:

[Formula 12]

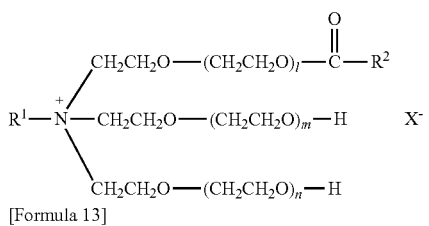
(1-1)

[Formula 13]

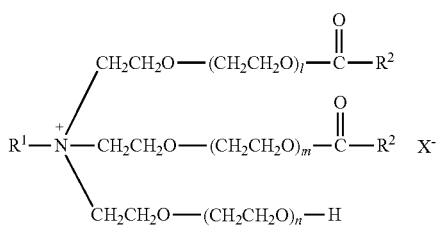
(1-2)

[Formula 14]

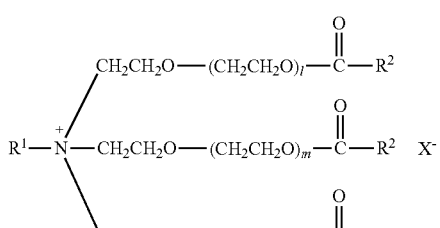
(1-3)

[Formula 15]

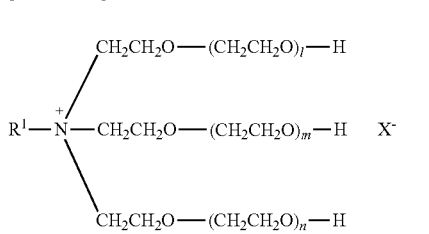
(1-4)

wherein $R^1$ denotes a linear alkyl group having 1 or more and 4 or less carbon atoms, a linear alkenyl group having 2 or more and 4 or less carbon atoms, a branched alkyl group having 3 or more and 4 or less carbon atoms, or a branched alkenyl group having 3 or more and 4 or less carbon atoms;

$R^2$ denotes a linear or branched alkyl group or alkenyl group having 5 or more and 17 or less carbon atoms; each of l, m and n denotes an average number of moles of added $CH_2CH_2O$ group, a total of l, m and n [l+m+n] being 1 or more and 15 or less; and $X^-$ denotes a counter ion; and $$R^3-COOH \quad (2)$$

wherein $R^3$ denotes a linear or branched alkyl group or alkenyl group having 5 or more and 17 or less carbon atoms.

<4>

An efficacy-enhancing agent composition for amino acid-based agrochemicals, containing compound (A1) represented by the following general formula (1-1), compound (B) represented by the following general formula (2), and at least one compound selected from compound (A2) represented by the following general formula (1-2), compound (A3) represented by the following general formula (1-3) and compound (A4) represented by the following general formula (1-4), wherein a mass ratio of a content of compound (A3) to a sum of a content of compound (A1) and a content of compound (A2), [content of compound (A3)]/[sum of content of compound (A1) and content of compound (A2)], is 0/100 or more and 9/91 or less;

a mass ratio of the content of compound (A2) to the content of compound (A1), [content of compound (A2)]/[content of compound (A1)], is 0/100 or more and 60/40 or less; and a mass ratio of a content of compound (B) to the content of compound (A1), [content of compound (B)]/[content of compound (A1)], is 1/500 or more and 1/5.2 or less:

[Formula 16]

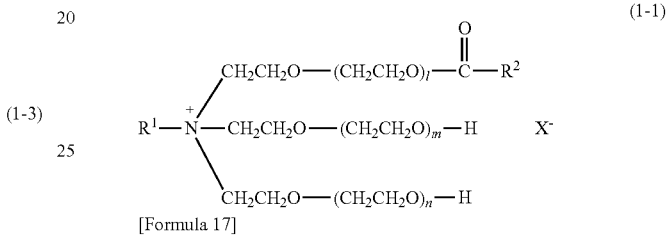
(1-1)

[Formula 17]

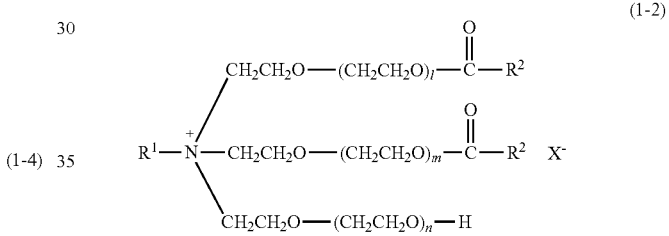
(1-2)

[Formula 18]

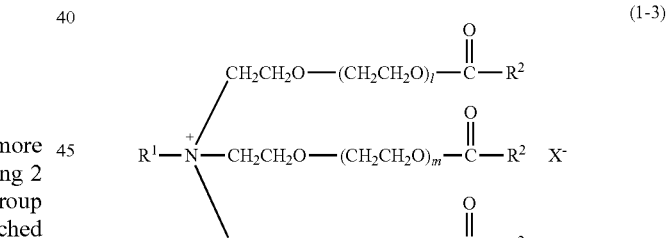
(1-3)

[Formula 19]

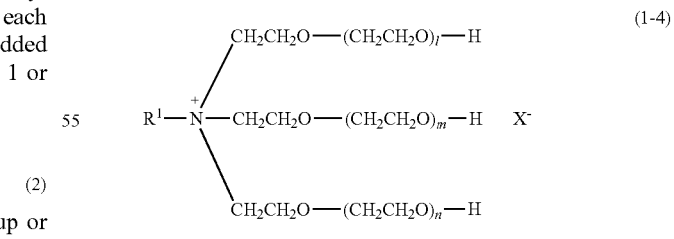
(1-4)

wherein $R^1$ denotes a linear alkyl group having 1 or more and 4 or less carbon atoms, a linear alkenyl group having 2 or more and 4 or less carbon atoms, a branched alkyl group having 3 or more and 4 or less carbon atoms, or a branched alkenyl group having 3 or more and 4 or less carbon atoms;

$R^2$ denotes a linear or branched alkyl group or alkenyl group having 5 or more and 17 or less carbon atoms; each of l, m and n denotes an average number of moles of added $CH_2CH_2O$ group, a total of l, m and n [l+m+n] being 1 or more and 15 or less; and X⁻ denotes a counter ion; and $$R^3—COOH \quad (2)$$

wherein $R^3$ denotes a linear or branched alkyl group or alkenyl group having 5 or more and 17 or less carbon atoms.

<5>

An efficacy-enhancing agent composition for amino acid-based agrochemicals, containing compound (A1) represented by the following general formula (1-1), compound (A2) represented by the following general formula (1-2), compound (A3) represented by the following general formula (1-3), compound (A4) represented by the following general formula (1-4) and compound (B) represented by the following general formula (2), wherein a mass ratio of a content of compound (A3) to a sum of a content of compound (A1) and a content of compound (A2), [content of compound (A3)]/[sum of content of compound (A1) and content of compound (A2)], is 1/99 or more and 9/91 or less;

a mass ratio of the content of compound (A2) to the content of compound (A1), [content of compound (A2)]/[content of compound (A1)], is 5/95 or more and 60/40 or less; and a mass ratio of a content of compound (B) to the content of compound (A1), [content of compound (B)]/[content of compound (A1)], is 1/500 or more and 1/5.2 or less:

[Formula 20]

(1-1)

[Formula 21]

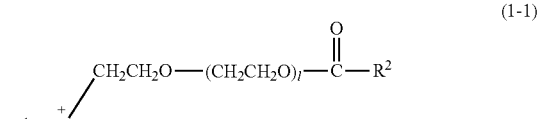

(1-2)

[Formula 22]

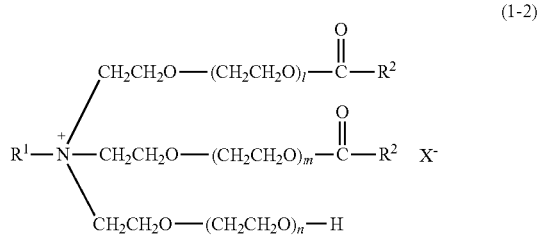

(1-3)

[Formula 23]

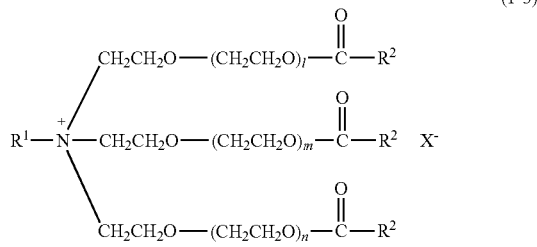

(1-4)

wherein $R^1$ denotes a linear alkyl group having 1 or more and 4 or less carbon atoms, a linear alkenyl group having 2 or more and 4 or less carbon atoms, a branched alkyl group having 3 or more and 4 or less carbon atoms, or a branched alkenyl group having 3 or more and 4 or less carbon atoms;

$R^2$ denotes a linear or branched alkyl group or alkenyl group having 5 or more and 17 or less carbon atoms; each of l, m and n denotes an average number of moles of added $CH_2CH_2O$ group, a total of l, m and n [l+m+n] being 1 or more and 15 or less; and X⁻ denotes a counter ion; and $$R^3—COOH \quad (2)$$

wherein $R^3$ denotes a linear or branched alkyl group or alkenyl group having 5 or more and 17 or less carbon atoms.

<6>

An efficacy-enhancing agent composition for amino acid-based agrochemicals, containing compound (A1) represented by the following general formula (1-1), compound (A2) represented by the following general formula (1-2), compound (A3) represented by the following general formula (1-3), compound (A4) represented by the following general formula (1-4) and compound (B) represented by the following general formula (2), wherein a mass ratio of a content of compound (A3) to a sum of a content of compound (A1) and a content of compound (A2), [content of compound (A3)]/[sum of content of compound (A1) and content of compound (A2)], is 1/99 or more and 9/91 or less;

a mass ratio of the content of compound (A2) to the content of compound (A1), [content of compound (A2)]/[content of compound (A1)], is 5/95 or more and 60/40 or less;

a mass ratio of a content of compound (A4) to the sum of the content of compound (A1) and the content of compound (A2), [content of compound (A4)]/[sum of content of compound (A1) and content of compound (A2)], is 10/90 or more and 70/30 or less; and a mass ratio of a content of compound (B) to the content of compound (A1), [content of compound (B)]/[content of compound (A1)], is 1/500 or more and 1/5.2 or less:

[Formula 24]

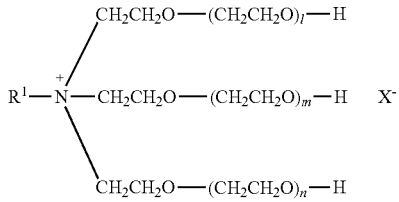

(1-1)

-continued

[Formula 25]

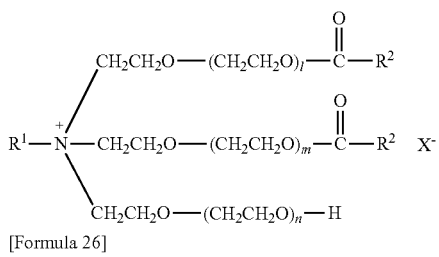
(1-2)

[Formula 26]

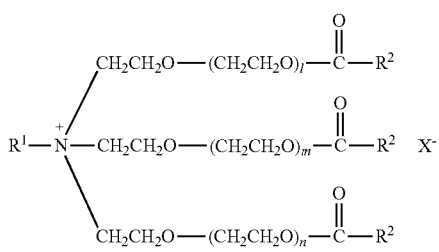
(1-3)

[Formula 27]

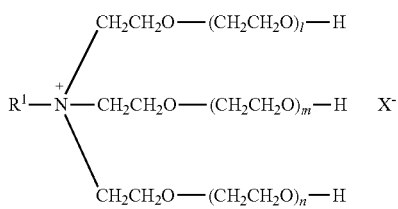
(1-4)

wherein $R^1$ denotes a linear alkyl group having 1 or more and 4 or less carbon atoms, a linear alkenyl group having 2 or more and 4 or less carbon atoms, a branched alkyl group having 3 or more and 4 or less carbon atoms, or a branched alkenyl group having 3 or more and 4 or less carbon atoms;

$R^2$ denotes a linear or branched alkyl group or alkenyl group having 5 or more and 17 or less carbon atoms; each of l, m and n denotes an average number of moles of added $CH_2CH_2O$ group, a total of l, m and n [l+m+n] being 1 or more and 15 or less; and $X^-$ denotes a counter ion; and $$R^3—COOH \quad (2)$$

wherein $R^3$ denotes a linear or branched alkyl group or alkenyl group having 5 or more and 17 or less carbon atoms.

<7>

The efficacy-enhancing agent composition for amino acid-based agrochemicals described in any one of <1> to <6>, wherein compound (A1) is a compound of general formula (1-1) in which $R^1$ is a linear group.

<8>

The efficacy-enhancing agent composition for amino acid-based agrochemicals described in any one of <1> to <7>, wherein compound (A1) is a compound of general formula (1-1) in which $R^1$ is an alkyl group having 1 or more and 3 or less carbon atoms, preferably 1 or more and 2 or less carbon atoms, and more preferably 1 carbon atom.

<9>

The efficacy-enhancing agent composition for amino acid-based agrochemicals described in any one of <1> to <8>, wherein compound (A1) is a compound of general formula (1-1) in which $R^1$ is a linear alkyl group having 1 or more and 3 or less carbon atoms, preferably a linear alkyl group having 1 or more and 2 or less carbon atoms, and more preferably a linear alkyl group having 1 carbon atom.

<10>

The efficacy-enhancing agent composition for amino acid-based agrochemicals described in any one of <1> to <9>, wherein compound (A1) is a compound of general formula (1-1) in which $R^2$ is a linear group.

<11>

The efficacy-enhancing agent composition for amino acid-based agrochemicals described in any one of <1> to <10>, wherein compound (A1) is a compound of general formula (1-1) in which $R^2$ is an alkyl group.

<12>

The efficacy-enhancing agent composition for amino acid-based agrochemicals described in any one of <1> to <11>, wherein compound (A1) is a compound of general formula (1-1) in which $R^2$ is a group having 7 or more carbon atoms, and preferably 9 or more carbon atoms, and 15 or less carbon atoms, and preferably 13 or less carbon atoms.

<13>

The efficacy-enhancing agent composition for amino acid-based agrochemicals described in any one of <1> to <12>, wherein compound (A1) is a compound of general formula (1-1) in which $R^2$ is a linear alkyl group having 7 or more and 13 or less carbon atoms, and preferably a linear alkyl group having 9 or more and 13 or less carbon atoms.

<14>

The efficacy-enhancing agent composition for amino acid-based agrochemicals described in any one of <1> to <13>, wherein compound (A1) is a compound of general formula (1-1) in which the total of l, m and n [l+m+n] is 2 or more, preferably 3 or more, more preferably 4 or more, and further preferably 5 or more, and is 12 or less, preferably 10 or less, more preferably 9 or less, further preferably 8 or less, and furthermore preferably 7 or less.

<15>

The efficacy-enhancing agent composition for amino acid-based agrochemicals described in any one of <1> to <14>, wherein compound (A1) is a compound of general formula (1-1) in which $X^-$ is a halide ion, an alkyl sulfate anion, an alkylbenzenesulfonate anion or a fatty acid anion, preferably a halide ion or an alkyl sulfate anion, more preferably an alkyl sulfate anion, further preferably a methyl sulfate anion or an ethyl sulfate anion, and furthermore preferably a methyl sulfate anion.

<16>

The efficacy-enhancing agent composition for amino acid-based agrochemicals described in any one of <2> to <15>, wherein the content of compound (A1) with respect to a total of the contents of compound (A1), compound (A2), compound (A3), compound (A4) and compound (B) is 25% by mass or more, preferably 35% by mass or more, more preferably 40% by mass or more, further preferably 45% by mass or more, and furthermore preferably 48% by mass or more, and is 60% by mass or less, preferably 55% by mass or less, more preferably 54% by mass or less, and further preferably 53% by mass or less.

<17>

The efficacy-enhancing agent composition for amino acid-based agrochemicals described in any one of <1> to <16>, wherein compound (A1) represented by general formula (1-1) is a compound obtained by a production method selected from the following production methods 1 to 3, preferably by a production method selected from the production method 1 and the production method 2, and more preferably by the production method 1:

Production method 1: A compound represented by general formula (1-5) (hereinafter also referred to as a triethanolamine EO adduct) is reacted with a fatty acid satisfying the condition for the carbon number of $R^2$ for esterification, and the resultant is further quaternized.

Production method 2: An oil or fat containing a fatty acid portion satisfying the condition for the carbon number of $R^2$ and a triethanolamine EO adduct are mixed in an optional ratio for transesterification, and the resultant is then further quaternized.

Production method 3: Triethanolamine, a fatty acid satisfying the condition for the carbon number of $R^2$, and ethylene oxide are reacted simultaneously with one another, and the resultant is further quaternized.

[Formula 28]

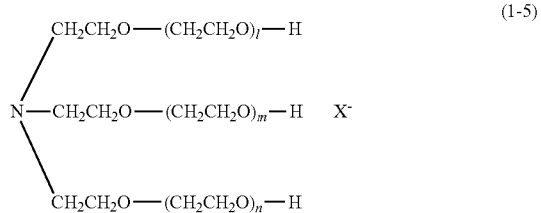

(1-5)

wherein each of l, m and n denotes an average number of moles of added $CH_2CH_2O$ group, a total of l, m and n [l+m+n] being 1 or more and 15 or less.
<18>
The efficacy-enhancing agent composition for amino acid-based agrochemicals described in any one of <1> to <17>, wherein the mass ratio of the content of compound (A3) to the sum of the content of compound (A1) and the content of compound (A2), [content of compound (A3)]/[sum of content of compound (A1) and content of compound (A2)], is 1/99 or more, preferably 2/98 or more, more preferably 3/97 or more, and further preferably 4/96 or more, and 8/92 or less, more preferably 7/93 or less, further preferably 6/94 or less, and further preferably 5/95 or less.
<19>
The efficacy-enhancing agent composition for amino acid-based agrochemicals described in any one of <1> to <18>, wherein the mass ratio of the content of compound (A2) to the content of compound (A1), [content of compound (A2)]/[content of compound (A1)], is 5/95 or more, preferably 10/90 or more, more preferably 15/85 or more, further preferably 20/80 or more, and furthermore preferably 25/75 or more, and 55/45 or less, preferably 50/50 or less, more preferably 45/55 or less, further preferably 40/60 or less, and furthermore preferably 35/65 or less.
<20>
The efficacy-enhancing agent composition for amino acid-based agrochemicals described in any one of <2> to <19>, wherein compound (A2) is contained, and the content of compound (A2) with respect to the total of the respective contents of compound (A1), compound (A2), compound (A3), compound (A4) and compound (B) is 1% by mass or more, preferably 10% by mass or more, more preferably 15% by mass or more, further preferably 19% by mass or more, and furthermore preferably 19.5% by mass or more, and 30% by mass or less, preferably 25% by mass or less, more preferably 23% by mass or less, and further preferably 22% by mass or less.
<21>
The efficacy-enhancing agent composition for amino acid-based agrochemicals described in any one of <2> to <20>, wherein compound (A3) is contained, and the content of compound (A3) with respect to the total of the respective contents of compound (A1), compound (A2), compound (A3), compound (A4) and compound (B) is 1.0% by mass or more, preferably 2.0% by mass or more, more preferably 2.5% by mass or more, and further preferably 2.8% by mass or more, and 5% by mass or less, preferably 4% by mass or less, more preferably 3.5% by mass or less, further preferably 3.3% by mass or less, and further preferably 3.1% by mass or less.
<22>
The efficacy-enhancing agent composition for amino acid-based agrochemicals described in any one of <2> to <21>, wherein compound (A4) is contained, and the content of compound (A4) with respect to the total of the respective contents of compound (A1), compound (A2), compound (A3), compound (A4) and compound (B) is 1% by mass or more, preferably 10% by mass or more, more preferably 15% by mass or more, further preferably 20% by mass or more, and furthermore preferably 22% by mass or more, and 35% by mass or less, preferably 30% by mass or less, more preferably 28% by mass or less, and further preferably 26% by mass or less.
<23>
The efficacy-enhancing agent composition for amino acid-based agrochemicals described in any one of <2> to <22>, wherein the mass ratio of the content of compound (A4) to the sum of the content of compound (A1) and the content of compound (A2), [content of compound (A4)]/[sum of content of compound (A1) and content of compound (A2)], is 0/100 or more, preferably 10/90 or more, more preferably 15/85 or more, further preferably 20/80 or more, furthermore preferably 22/78 or more, and furthermore preferably 23/77 or more, and 70/30 or less, preferably 60/40 or less, more preferably 50/50 or less, further preferably 40/60 or less, and furthermore preferably 30/70 or less.
<24>
The efficacy-enhancing agent composition for amino acid-based agrochemicals described in any one of <2> to <23>, wherein the mass ratio of the content of compound (A4) to the sum of the content of compound (A1), the content of compound (A2) and the content of compound (A3), [content of compound (A4)]/[sum of content of compound (A1), content of compound (A2) and content of compound (A3)], is 0/100 or more, preferably 10/90 or more, more preferably 15/85 or more, further preferably 20/80 or more, furthermore preferably 22/78 or more, and furthermore preferably 23/77 or more, and 70/30 or less, preferably 60/40 or less, more preferably 50/50 or less, further preferably 40/60 or less, and furthermore preferably 30/70 or less.
<25>
The efficacy-enhancing agent composition for amino acid-based agrochemicals described in any one of <2> to <24>, wherein the content of compound (A1) with respect to the total of the respective contents of compound (A1), compound (A2), compound (A3) and compound (A4), namely, the content of compound (A), is 40% by mass or more, preferably 42% by mass or more, more preferably 45% by mass or more, further preferably 48% by mass or more, and furthermore preferably 50% by mass or more, and 100% by mass or less, preferably 80% by mass or less, more preferably 70% by mass or less, further preferably 60% by mass or less, furthermore preferably 55% by mass or less, and furthermore preferably 53% by mass or less.

<26>

The efficacy-enhancing agent composition for amino acid-based agrochemicals described in any one of <1> to <25>, wherein compound (B) is a compound of general formula (2) in which $R^3$ is a linear group.

<27>

The efficacy-enhancing agent composition for amino acid-based agrochemicals described in any one of <1> to <26>, wherein compound (B) is a compound of general formula (2) in which $R^3$ is an alkyl group.

<28>

The efficacy-enhancing agent composition for amino acid-based agrochemicals described in any one of <1> to <27>, wherein compound (B) is a compound of general formula (2) in which $R^3$ is a group having 7 or more carbon atoms, and preferably 9 or more carbon atoms, and 15 or less carbon atoms, and preferably 13 or less carbon atoms.

<29>

The efficacy-enhancing agent composition for amino acid-based agrochemicals described in any one of <1> to <28>, wherein compound (B) is a compound of general formula (2) in which $R^3$ is a linear alkyl group having 7 or more and 13 or less carbon atoms, and preferably a linear alkyl group having 9 or more and 13 or less carbon atoms.

<30>

The efficacy-enhancing agent composition for amino acid-based agrochemicals described in any one of <1> to <29>, wherein the mass ratio of the content of compound (B) to the content of compound (A1), [content of compound (B)]/[content of compound (A1)], is, from the viewpoint of enhancing the efficacy of an agrochemical and the viewpoint of the productivity of the efficacy-enhancing agent composition for amino acid-based agrochemicals, 1/103 or more, preferably 1/100 or more, more preferably 1/60 or more, further preferably 1/50 or more, furthermore preferably 1/31 or more, furthermore preferably 1/20 or more, furthermore preferably 1/10 or more, and furthermore preferably 1/8 or more, and 1/5.5 or less, preferably 1/6.0 or less, and more preferably 1/6.2 or less.

<31>

The efficacy-enhancing agent composition for amino acid-based agrochemicals described in any one of <1> to <29>, wherein the mass ratio of the content of compound (B) to the content of compound (A1), [content of compound (B)]/[content of compound (A1)], is, from the viewpoint of excellent formulation stability of an agrochemical composition, preferably 1/5.5 or less, more preferably 1/6.0 or less, further preferably 1/6.2 or less, furthermore preferably 1/15 or less, furthermore preferably 1/20 or less, furthermore preferably 1/25 or less, furthermore preferably 1/31 or less, furthermore preferably 1/50 or less, furthermore preferably 1/60 or less, and furthermore preferably 1/100 or less.

<32>

The efficacy-enhancing agent composition for amino acid-based agrochemicals described in any one of <2> to <31>, wherein, assuming that (A1), compound (A2), compound (A3) and compound (A4) are collectively designated as compound (A), the mass ratio of the content of compound (B) to the content of compound (A), [content of compound (B)]/[content of compound (A)], is 1/950 or more, preferably 1/200 or more, more preferably 1/150 or more, further preferably 1/100 or more, furthermore preferably 1/90 or more, furthermore preferably 1/40 or more, furthermore preferably 1/20 or more, and further preferably 1/16 or more, and 1/10 or less, preferably 1/11 or less, more preferably 1/11.5 or less, and further preferably 1/12 or less.

<33>

The efficacy-enhancing agent composition for amino acid-based agrochemicals described in any one of <2> to <32>, wherein the content of compound (B) with respect to the total of the contents of compound (A1), compound (A2), compound (A3), compound (A4) and compound (B) is 0.1% by mass or more, preferably 0.5% by mass or more, more preferably 0.8% by mass or more, and further preferably 1.0% by mass or more, and 9.0% by mass or less, preferably 8.5% by mass or less, more preferably 8.0% by mass or less, further preferably 6% by mass or less, furthermore preferably 4% by mass or less, furthermore preferably 2.5% by mass or less, and furthermore preferably 2.0% by mass or less.

<34>

The efficacy-enhancing agent composition for amino acid-based agrochemicals described in any one of <1> to <33>, containing a quaternized product of a reaction product between a compound represented by the following general formula (1-5) and a fatty acid having 6 or more and 18 or less carbon atoms, and compound (B):

[Formula 29]

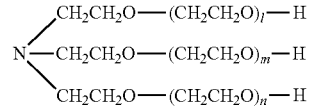

(1-5)

wherein each of l, m and n denotes an average number of moles of added $CH_2CH_2O$ group, a total of l, m and n [l+m+n] being 1 or more and 15 or less.

<35>

The efficacy-enhancing agent composition for amino acid-based agrochemicals described in any one of <1> to <34>, containing a quaternized product of a reaction product between a compound represented by the following general formula (1-5) and a fatty acid having 6 or more and 18 or less carbon atoms, and compound (B), wherein the quaternized product contains compound (A1) and compound (B):

[Formula 30]

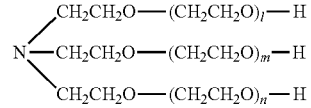

(1-5)

wherein each of l, m and n denotes an average number of moles of added $CH_2CH_2O$ group, a total of l, m and n [l+m+n] being 1 or more and 15 or less.

<36>

The efficacy-enhancing agent composition for amino acid-based agrochemicals described in any one of <1> to <35>, containing a quaternized product of a reaction product between a compound represented by the following general formula (1-5) and a fatty acid having 6 or more and 18 or less carbon atoms, and compound (B), wherein the quaternized product contains compound (A1), compound (A2), compound (A3), compound (A4) and compound (B);

the mass ratio of the content of compound (A3) to the sum of the content of compound (A1) and the content of compound (A2), [content of compound (A3)]/[sum of content of compound (A1) and content of compound (A2)], is 1/99 or more and 10/90 or less;

the mass ratio of the content of compound (A2) to the content of compound (A1), [content of compound (A2)]/[content of compound (A1)], is 5/95 or more and 60/40 or less; and the mass ratio of the content of compound (B) to the content of compound (A1), [content of compound (B)]/[content of compound (A1)], is 1/500 or more and 1/5.2 or less:

[Formula 31]

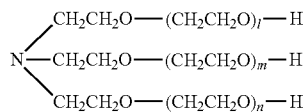

(1-5)

wherein each of l, m and n denotes an average number of moles of added $CH_2CH_2O$ group, a total of l, m and n [l+m+n] being 1 or more and 15 or less.

<37>

An agrochemical composition containing the efficacy-enhancing agent composition for amino acid-based agrochemicals described in any one of <1> to <36>, amino acid-based agrochemical active ingredient (C) and water.

<38>

An agrochemical composition containing compound (A1) represented by the following general formula (1-1), compound (B) represented by the following general formula (2), amino acid-based agrochemical active ingredient (C) and water, optionally compound (A2) represented by the following general formula (1-2), and optionally compound (A3) represented by the following general formula (1-3), wherein a mass ratio of a content of compound (A3) to a sum of a content of compound (A1) and a content of compound (A2), [content of compound (A3)]/[sum of content of compound (A1) and content of compound (A2)], is 0/100 or more and 9/91 or less;

a mass ratio of the content of compound (A2) to the content of compound (A1), [content of compound (A2)]/[content of compound (A1)], is 0/100 or more and 60/40 or less; and a mass ratio of a content of compound (B) to the content of compound (A1), [content of compound (B)]/[content of compound (A1)], is 1/500 or more and 1/5.2 or less:

[Formula 32]

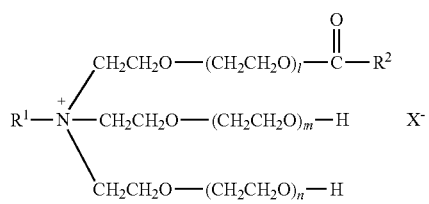

(1-1)

[Formula 33]

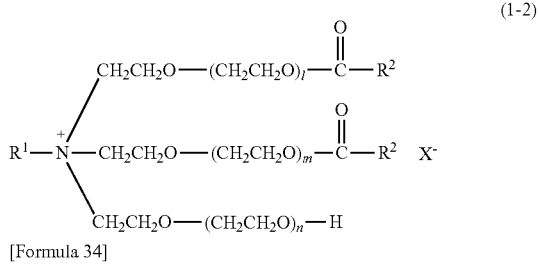

(1-2)

[Formula 34]

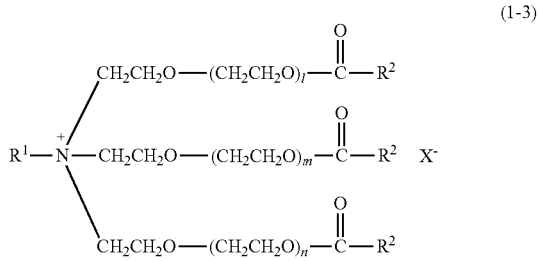

(1-3)

wherein $R^1$ denotes a linear alkyl group having 1 or more and 4 or less carbon atoms, a linear alkenyl group having 2 or more and 4 or less carbon atoms, a branched alkyl group having 3 or more and 4 or less carbon atoms, or a branched alkenyl group having 3 or more and 4 or less carbon atoms;

$R^2$ denotes a linear or branched alkyl group or alkenyl group having 5 or more and 17 or less carbon atoms; each of l, m and n denotes an average number of moles of added $CH_2CH_2O$ group, a total of l, m and n [l+m+n] being 1 or more and 15 or less; and $X^-$ denotes a counter ion; and $$R^3\text{—COOH} \qquad (2)$$

wherein $R^3$ denotes a linear or branched alkyl group or alkenyl group having 5 or more and 17 or less carbon atoms.

<39>

The agrochemical composition described in <37> or <38>, wherein amino acid-based agrochemical active ingredient (C) is an agrochemical active ingredient (active component) of an amino acid-based herbicide.

<40>

The agrochemical composition described in <39>, wherein the agrochemical active ingredient (active component) of the amino acid-based herbicide is a compound selected from glyphosate [N-(phosphonomethyl)glycine or a salt thereof], bialaphos [sodium salt of L-2-amino-4-[(hydroxy)(methyl) phosphinoyl]butyryl-L-alanyl-L-alanine] and glufosinate [ammonium-DL-homoalanine-4-yl(methyl) phosphinate].

<41>

The agrochemical composition described in any one of <37> to <40>, wherein amino acid-based agrochemical active ingredient (C) is N-(phosphonomethyl)glycine or a salt thereof, or ammonium-DL-homoalanine-4-yl(methyl) phosphinate, and is preferably N-(phosphonomethyl)glycine or a salt thereof.

<42>

The agrochemical composition described in any one of <37> to <41>, containing amino acid-based agrochemical active ingredient (C) in an amount of 10% by mass or more, preferably 20% by mass or more, more preferably 30% by mass or more, and further preferably 35% by mass or more, and 70% by mass or less, preferably 60% by mass or less, more preferably 50% by mass or less, and further preferably 45% by mass or less.

<43>

The agrochemical composition described in any one of <37> to <42>, containing compound (A1) in an amount of 2% by mass or more, preferably 3% by mass or more, more preferably 3.2% by mass or more, further preferably 3.4% by mass or more, and furthermore preferably 3.6% by mass or more, and 10% by mass or less, preferably 8% by mass or less, more preferably 6% by mass or less, further preferably 5.0% by mass or less, furthermore preferably 4.5% by mass or less, and furthermore preferably 4.0% by mass or less.

<44>

The agrochemical composition described in any one of <37> to <43>, containing compound (A2) in an amount of 0.5% by mass or more, preferably 1.0% by mass or more, more preferably 1.2% by mass or more, further preferably 1.4% by mass or more, and furthermore preferably 1.5% by mass or more, and 5.0% by mass or less, preferably 3.0% by mass or less, more preferably 2.5% by mass or less, further preferably 2.0% by mass or less, and furthermore preferably 1.7% by mass or less.

<45>

The agrochemical composition described in any one of <37> to <44>, containing compound (A3) in an amount of 0.05% by mass or more, preferably 0.10% by mass or more, more preferably 0.15% by mass or more, and further preferably 0.20% by mass or more, and 1.0% by mass or less, preferably 0.6% by mass or less, more preferably 0.5% by mass or less, further preferably 0.4% by mass or less, and furthermore preferably 0.3% by mass or less.

<46>

The agrochemical composition described in any one of <37> to <45>, optionally containing compound (A4) represented by the following general formula (1-4):

[Formula 35]

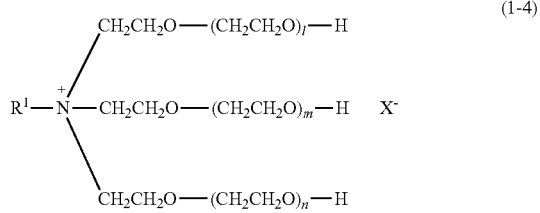

(1-4)

wherein $R^1$ denotes a linear alkyl group having 1 or more and 4 or less carbon atoms, a linear alkenyl group having 2 or more and 4 or less carbon atoms, a branched alkyl group having 3 or more and 4 or less carbon atoms, or a branched alkenyl group having 3 or more and 4 or less carbon atoms;

each of l, m and n denotes an average number of moles of added $CH_2CH_2O$ group, a total of l, m and n [l+m+n] being 1 or more and 15 or less; and $X^-$ denotes a counter ion.

<47>

The agrochemical composition described in <46>, containing compound (A4) in an amount of 0.5% by mass or more, preferably 1.0% by mass or more, more preferably 1.2% by mass or more, further preferably 1.4% by mass or more, and furthermore preferably 1.6% by mass or more, and 5.0% by mass or less, preferably 3.0% by mass or less, more preferably 2.4% by mass or less, and further preferably 2.0% by mass or less.

<48>

The agrochemical composition described in any one of <37> to <47>, containing compound (B) in an amount of 0.01% by mass or more, preferably 0.05% by mass or more, more preferably 0.08% by mass or more, further preferably 0.09% by mass or more, and further preferably 0.11% by mass or more, and 0.7% by mass or less, preferably 0.65% by mass or less, more preferably 0.60% by mass or less, further preferably 0.30% by mass or less, furthermore preferably 0.20% by mass or less, and furthermore preferably 0.15% by mass or less.

<49>

The agrochemical composition described in any one of <37> to <48>, containing water in an amount of 20% by mass or more, preferably 30% by mass or more, more preferably 40% by mass or more, and further preferably 45% by mass or more, and 70% by mass or less, preferably 60% by mass or less, and more preferably 55% by mass or less.

<50>

A weeding method, including spraying, on a plant, an agrochemical spray solution prepared from the agrochemical composition described in any one of <37> to <49>.

<51>

The weeding method described in <50>, wherein a concentration of compound (A1) in the agrochemical spray solution is 30 ppm or more, 100 ppm or more, 120 ppm or more, 150 ppm or more, 170 ppm or more, or 200 ppm or more, and 50000 ppm or less, 5000 ppm or less, 2000 ppm or less, 1000 ppm or less, 600 ppm or less, 500 ppm or less, or 400 ppm or less.

<52>

The weeding method described in <50> or <51>, wherein a concentration of compound (B) in the agrochemical spray solution is 0.5 ppm or more, 1 ppm or more, 2 ppm or more, 3 ppm or more, 4 ppm or more, or 5 ppm or more, and 150 ppm or less, 100 ppm or less, 40 ppm or less, 20 ppm or less, 10 ppm or less, or 8 ppm or less.

<53>

The weeding method described in any one of <50> to <52>, wherein the agrochemical spray solution is sprayed in a ratio of 50 L/ha or more, preferably 200 L/ha or more, more preferably 400 L/ha or more, and further preferably 500 L/ha or more, and 1000 L/ha or less, preferably 800 L/ha or less, and more preferably 600 L/ha or less.

<54>

The weeding method described in any one of <50> to <53>, wherein the plant is a weed selected from broad leaf weeds and gramineous weeds, further a weed selected from a barnyard grass, a morning glory and a velvetleaf, and further a barnyard grass.

<55>

Use of the composition described in any one of <1> to <36> above as an efficacy-enhancing agent for amino acid-based agrochemicals.

<56>

Use of the composition described in any one of <1> to <36> above for enhancing an efficacy of an amino acid-based agrochemical.

<57>

A method for using the composition described in any one of <1> to <36> above to enhance an efficacy of an amino acid-based agrochemical.

<58>

A method for producing an agrochemical composition, including mixing the efficacy-enhancing agent composition for amino acid-based agrochemicals described in any one of <1> to <36> above, amino acid-based agrochemical active ingredient (C) and water.

<59>

Use of the composition described in any one of <37> to <49> above as an agrochemical composition.

EXAMPLES

Synthesis Examples

Synthesis Example A1: Synthesis of Triethanolamine EO Adduct A1

An autoclave was charged with 298 g of triethanolamine and 1.1 g of potassium hydroxide. Conditions inside the autoclave were set to 100° C. and a pressure of 3.9 kPa, and a dehydration reaction was performed for 1 hour under these conditions. Then, the temperature was increased to 150 to 160° C., 264 g of ethylene oxide was introduced into the autoclave at this temperature to perform an addition reaction, and thus, triethanolamine EO adduct A1 (having an average number of moles of added EO of 3 moles) was obtained.

Synthesis Example A2: Synthesis of Triethanolamine EO Adduct A2

In the same manner as in Synthesis Example A1, 529 g of ethylene oxide was introduced into the autoclave to obtain triethanolamine EO adduct A2 (having an average number of moles of added EO of 6 moles).

Synthesis Example A3: Synthesis of Triethanolamine EO Adduct A3

In the same manner as in Synthesis Example A1, 793 g of ethylene oxide was introduced into the autoclave to obtain triethanolamine EO adduct A3 (having an average number of moles of added EO of 9 moles).

Synthesis Example A4: Synthesis of Triethanolamine (EO) Adduct A4

In the same manner as in Synthesis Example A1, 1057 g of ethylene oxide was introduced into the autoclave to obtain triethanolamine EO adduct A4 (having an average number of moles of added EO of 12 moles).

Synthesis Example 1: Synthesis of Reaction Product a-1

A four-necked flask having a volume of 500 mL was charged with 94.1 g of lauric acid and 211.8 g of triethanolamine EO adduct A1 (with a molar ratio of lauric acid/triethanolamine EO adduct A1 set to 0.6/1), and a reaction was performed under conditions of normal pressure and at 140° C. for 1 hour, further followed by a dehydration condensation reaction under reduced pressure of 220 hPa and at 180° C. to obtain an ester amine. A quaternization reaction was performed by using 267.3 g of the thus obtained ester amine and 84.1 g of dimethyl sulfate at 60° C. for 2 hours to obtain reaction product a-1.

Synthesis Example 2: Synthesis of Reaction Product a-2

In the same manner as in Synthesis Example 1, 100.3 g of a coconut oil fatty acid and 205.4 g of triethanolamine EO adduct A1 were used to obtain an ester amine. In the same manner as in Synthesis Example 1, 262.5 g of the thus obtained ester amine and 80.2 g of dimethyl sulfate were used to obtain reaction product a-2.

Synthesis Example 3: Synthesis of Reaction Product a-3

In the same manner as in Synthesis Example 1, 75.8 g of a coconut oil fatty acid and 227.7 g of triethanolamine EO adduct A2 were used to obtain an ester amine. In the same manner as in Synthesis Example 1, 187.7 g of the thus obtained ester amine and 43.8 g of dimethyl sulfate were used to obtain reaction product a-3.

Synthesis Example 4: Synthesis of Reaction Product a-4

In the same manner as in Synthesis Example 1, 81.4 g of a coconut oil fatty acid and 321.1 g of triethanolamine EO adduct A3 were used to obtain an ester amine. In the same manner as in Synthesis Example 1, 336.5 g of the thus obtained ester amine and 62.8 g of dimethyl sulfate were used to obtain reaction product a-4.

Synthesis Example 5: Synthesis of Reaction Product a-5

In the same manner as in Synthesis Example 1, 66.2 g of a coconut oil fatty acid and 334.9 g of triethanolamine EO adduct A4 were used to obtain an ester amine. In the same manner as in Synthesis Example 1, 345.0 g of the thus obtained ester amine and 55.0 g of dimethyl sulfate were used to obtain reaction product a-5.

Synthesis Example 6: Synthesis of Reaction Product a-6

In the same manner as in Synthesis Example 1, 120.5 g of a coconut oil fatty acid and 285.5 g of triethanolamine EO adduct A3 were used to obtain an ester amine. In the same manner as in Synthesis Example 1, 342.6 g of the thus obtained ester amine and 56.8 g of dimethyl sulfate were used to obtain reaction product a-6.

Synthesis Example 7: Synthesis of Reaction Product a-7

A four-necked flask having a volume of 500 mL was charged with 81.4 g of a coconut oil fatty acid and 321.1 g of triethanolamine EO adduct A3, and a reaction was performed under conditions of normal pressure and at 140° C. for 3 hours, further followed by a dehydration condensation reaction under reduced pressure of 220 hPa and at 180 to 185° C. to obtain an ester amine. In the same manner as in Synthesis Example 1, 336.5 g of the thus obtained ester amine and 56.8 g of dimethyl sulfate were used to obtain reaction product a-7.

Comparative Synthesis Example 1: Synthesis of Comparative Reaction Product a-1

An autoclave was charged with 100 g of triethanolamine, 99 g of lauric acid and 0.7 kg of a 48% potassium hydroxide aqueous solution. Conditions inside the autoclave were set to 100° C. and 4.0 kPa (30 torr), and a dehydration reaction was performed for 1 hour under these conditions. Then, the temperature was increased to 150° C., and 259 g of ethylene oxide was introduced into the autoclave at this temperature to perform an addition reaction. After completing the reaction, the thus obtained reaction mixture was transferred to a treatment tank. 7 g of an adsorbent (Kyowaad 600S, Kyowa Chemical Industry Co., Ltd.) was added to the reaction mixture, and the thus obtained mixture was stirred at 80° C. and 4.0 kPa (30 torr) for 1 hour. The resultant reaction mixture was filtered to obtain a filtrate as a product. In an autoclave, 183.7 g of the thus obtained product and 40.1 g of methyl chloride were reacted by stirring at 60° C. for 3 hours, the resultant was then stirred at 60° C. and 25 kPa for 1 hour with nitrogen introduced thereinto at 6 L/hr·kg, and an unreacted portion of the methyl chloride was distilled off for quaternization to obtain comparative reaction product a-1.

The structures, compositions and composition ratios of reaction products a-1 to a-7 and comparative reaction product a-1 obtained as described above are shown in Table 1. It is noted that each of reaction products a-1 to a-7 and comparative reaction product a-1 contains an unreacted fatty acid, namely, compound (B).

TABLE 1

| Symbol | Structure in general formulas (1-1) to (1-4) | | | | Composition (% by mass) Compound | | | | |
|---|---|---|---|---|---|---|---|---|---|
| | $R^1$ | $R^2$ | $l + m + n$ | $X'$ | (A1) | (A2) | (A3) | (A4) | Fatty acid |
| Reaction product a-1 | Methyl group | $C_{11}$ linear alkyl group | 3 | Methyl sulfate anion | 50.8 | 21.0 | 3.0 | 24.0 | 1.2 |
| Reaction product a-2 | Methyl group | $C_{11-13}$ linear alkyl group *1 | 3 | Methyl sulfate anion | 50.8 | 19.9 | 3.0 | 25.0 | 1.3 |
| Reaction product a-3 | Methyl group | $C_{11-13}$ linear alkyl group *1 | 6 | Methyl sulfate anion | 51.2 | 21.1 | 3.0 | 23.0 | 1.7 |
| Reaction product a-4 | Methyl group | $C_{11-13}$ linear alkyl group *1 | 9 | Methyl sulfate anion | 51.3 | 21.1 | 3.0 | 23.1 | 1.5 |
| Reaction product a-5 | Methyl group | $C_{11-13}$ linear alkyl group *1 | 12 | Methyl sulfate anion | 50.9 | 20.9 | 3.0 | 23.9 | 1.3 |
| Reaction product a-6 | Methyl group | $C_{11-13}$ linear alkyl group *1 | 9 | Methyl sulfate anion | 45.4 | 33.8 | 6.5 | 13.0 | 1.3 |
| Reaction product a-7 | Methyl group | $C_{11-13}$ linear alkyl group *1 | 9 | Methyl sulfate anion | 51.6 | 21.2 | 2.9 | 23.8 | 0.5 |
| Comparative reaction product a-1 | Methyl group | $C_{11}$ linear alkyl group | 12 | Chloride ion | 56.0 | 16.0 | 8.0 | 19.0 | 1.0 |

| Symbol | Composition ratio (mass ratio) | | | | | | |
|---|---|---|---|---|---|---|---|
| | Mass ratio to (A1) + (A2) + (A3) | | | (A3)/ [(A1) + (A2)] | (A2)/(A1) | (A4)/ [(A1) + (A2)] | (A4)/ [(A1) + (A2) + (A3)] |
| | (A1) | (A2) | (A3) | | | | |
| Reaction product a-1 | 68 | 28 | 4 | 4/96 | 29/71 | 25/75 | 24/76 |
| Reaction product a-2 | 69 | 27 | 4 | 4/96 | 28/72 | 26/74 | 25/765 |
| Reaction product a-3 | 68 | 28 | 4 | 4/96 | 29/71 | 24/76 | 23/77 |
| Reaction product a-4 | 68 | 28 | 4 | 4/96 | 29/71 | 24/76 | 23/77 |
| Reaction product a-5 | 68 | 28 | 4 | 4/96 | 29/71 | 25/75 | 24/76 |
| Reaction product a-6 | 53 | 39 | 8 | 8/92 | 43/57 | 14/86 | 13/87 |
| Reaction product a-7 | 68 | 28 | 4 | 4/96 | 29/71 | 25/76 | 24/76 |
| Comparative reaction product a-1 | 70 | 20 | 10 | 10/90 | 22/78 | 21/79 | 19/81 |

*1 corresponding to residue of coconut oil fatty acid

<Efficacy-Enhancing Agent Composition for Agrochemicals>

Example 1-1, Examples 1-4 to 1-9 and Comparative Example 1-3

The reaction products shown in Table 1 were directly used as efficacy-enhancing agent compositions for agrochemicals. The products were each referred to by signs shown in Table 2.

Example 1-2, Example 1-3, Comparative Example 1-1 and Comparative Example 1-2

Reaction product a-4 and a coconut oil fatty acid were weighed to obtain each composition shown in Table 2 so that a total weight of the resultant efficacy-enhancing agent composition for agrochemicals could be 50 g, and the resultant was stirred and mixed for 10 minutes by a stirrer to obtain the efficacy-enhancing agent composition for agrochemicals.

Compositions of the efficacy-enhancing agent compositions for agrochemicals of Examples 1-1 to 1-9 and Comparative Examples 1-1 to 1-3, and mass ratios of [content of compound (A3)]/[sum of content of compound (A1) and content of compound (A2)], [content of compound (A2)]/[content of compound (A1)], [content of compound (B)]/[content of compound (A1)], and [content of compound (B)]/[content of compound (A)] therein are shown in Table 2.

TABLE 2

| Eficacy-enhancing agent composition for agrochemicals | | Example | | | | | |
|---|---|---|---|---|---|---|---|
| | | 1-1 | 1-2 | 1-3 | 1-4 | 1-5 | 1-6 |
| Formulation composition | Reaction product | Reaction product a-4 100% by mass | Reaction product a-4 97% by mass | Reaction product a-4 94% by mass | Reaction product a-1 100% by mass | Reaction product a-2 100% by mass | Reaction product a-3 100% by mass |
| | Fatty acid | None | Coconut oil fatty acid 3% by mass | Coconut oil fatty acid 6% by mass | None | None | None |
| Content (% by mass) | Compound (A) | 98.5 | 95.5 | 92.6 | 98.8 | 98.7 | 98.3 |
| | Compound (A1) | 51.3 | 49.7 | 48.2 | 50.8 | 50.8 | 51.2 |
| | Compound (A2) | 21.1 | 20.5 | 19.8 | 21.0 | 19.9 | 21.1 |
| | Compound (A3) | 3.0 | 2.9 | 2.8 | 3.0 | 3.0 | 3.0 |
| | Compound (A4) | 23.1 | 22.4 | 21.8 | 24.0 | 25.0 | 23.0 |
| | Compound (B) | 1.5 | 4.5 | 7.4 | 1.2 | 1.3 | 1.7 |
| Mass ratio | (A3)/[(A1) + (A2)] | 4/96 | 4/96 | 4/96 | 4/96 | 4/96 | 4/96 |
| | (A2)/(A1) | 29/71 | 29/71 | 29/71 | 29/71 | 28/72 | 29/71 |
| | (B)/(A1) | 1/34.2 | 1/11.0 | 1/6.5 | 1/42.3 | 1/39.1 | 1/30.1 |
| | (B)/(A) | 1/65.7 | 1/21.2 | 1/12.5 | 1/82.3 | 1/75.9 | 1/57.8 |
| | (B)/[(A) + (B)] × 100 | 1.5 | 4.5 | 7.4 | 1.2 | 1.3 | 1.7 |
| | (B)/(A1) | 0.029 | 0.091 | 0.154 | 0.024 | 0.026 | 0.033 |
| | (A2)/[(A) + (B)] × 100 | 21.1 | 20.5 | 19.8 | 21.0 | 19.9 | 21.1 |
| | (A3)/[(A) + (B)] × 100 | 30 | 2.9 | 2.8 | 3.0 | 3.0 | 3.0 |
| | (A4)/[(A) + (B)] × 100 | 23.1 | 22.4 | 21.8 | 24.0 | 25.0 | 23.0 |
| | (A4)/[(A1) + (A2)] | 0.319 | 0.319 | 0.321 | 0.334 | 0.354 | 0.318 |
| | (A4)/[(A1) + (A2) + (A3)] | 0.306 | 0.309 | 0.308 | 0.321 | 0.339 | 0.305 |
| | (A1)/(A) | 0.521 | 0.520 | 0.521 | 0.514 | 0.515 | 0.521 |

| Efficacy-enhancing agent composition for agrochemicals | | Example | | | Comparative Example | | |
|---|---|---|---|---|---|---|---|
| | | 1-7 | 1-8 | 1-9 | 1-1 | 1-2 | 1-3 |
| Formulation composition | Reaction product | Reaction product a-5 100% by mass | Reaction product a-6 100% by mass | Reaction product a-7 100% by mass | Reaction product a-4 92% by mass | Reaction product a-4 90% by mass | Comparative reaction product a-1 100% by mass |
| | Fatty acid | None | None | None | Coconut oil fatty acid 8% by mass | Coconut oil fatty acid 10% by mass | None |
| Content (% by mass) | Compound (A) | 98.7 | 98.7 | 99.5 | 90.6 | 88.7 | 99.0 |
| | Compound (A1) | 50.9 | 45.4 | 51.6 | 47.2 | 46.2 | 56.0 |
| | Compound (A2) | 20.9 | 33.8 | 21.2 | 19.4 | 19.0 | 16.0 |
| | Compound (A3) | 3.0 | 6.5 | 2.9 | 2.8 | 2.7 | 8.0 |
| | Compound (A4) | 23.9 | 13.0 | 23.8 | 21.2 | 20.8 | 19.0 |
| | Compound (B) | 1.3 | 1.3 | 0.5 | 9.4 | 11.3 | 1.0 |
| Mass ratio | (A3)/[(A1) + (A2)] | 4/96 | 8/92 | 4/96 | 4/96 | 4/96 | 10/90 |
| | (A2)/(A1) | 29/71 | 43/57 | 29/71 | 29/71 | 29/71 | 22/78 |
| | (B)/(A1) | 1/39.2 | 1/34.9 | 1/103 | 1/5.0 | 1/4.1 | 1/56.0 |
| | (B)/(A) | 1/75.9 | 1/75.9 | 1/199 | 1/9.6 | 1/7.8 | 1/99.0 |
| | (B)/[(A) + (B)] × 100 | 1.3 | 1.3 | 0.5 | 9.4 | 11.3 | 1.0 |
| | (B)/(A1) | 0.026 | 0.029 | 0.010 | 0.199 | 0.245 | 0.018 |
| | (A2)/[(A) + (B)] × 100 | 20.9 | 33.8 | 21.2 | 19.4 | 19.0 | 16.0 |
| | (A3)/[(A) + (B)] × 100 | 3.0 | 6.5 | 2.9 | 2.8 | 2.7 | 8.0 |
| | (A4)/[(A) + (B)] × 100 | 23.9 | 13.0 | 23.8 | 21.2 | 20.8 | 19.0 |
| | (A4)/[(A1) + (A2)] | 0.333 | 0.164 | 0.327 | 0.318 | 0.319 | 0.264 |
| | (A4)/[(A1) + (A2) + (A3)] | 0.320 | 0.152 | 0.314 | 0.305 | 0.306 | 0.238 |
| | (A1)/(A) | 0.516 | 0.460 | 0.519 | 0.521 | 0.521 | 0.566 |

<Agrochemical Composition>

Examples 2-1 to 2-10 and Comparative Examples 2-1 to 2-3

One of the efficacy-enhancing agent compositions for agrochemicals, amino acid-based agrochemical active ingredient (C) and water were weighed to obtain each composition shown in Table 3 so that a total weight of the resultant agrochemical composition could be 100 g, and the resultant was stirred and mixed for 10 minutes by a stirrer to obtain the agrochemical composition.

It is noted that agrochemical active ingredients c-1 and c-2 used are as follows:
c-1: glyphosate isopropylamine salt
c-2: glufosinate ammonium salt Compositions of the agrochemical compositions of Examples 2-1 to 2-10 and Comparative Examples 2-1 to 2-3 are shown in Table 3.

Besides, the agrochemical compositions were tested for the formulation stability and herbicidal property as follows. These test results are also shown in Table 3.

[Formulation Stability of Agrochemical Composition]

40 g of each agrochemical composition immediately after the preparation was placed in a transparent glass container (volume: 50 ml), and the resultant was stored at 60° C. to evaluate the number of days during which a transparent and homogeneous appearance could be retained.

test. An agrochemical composition having a composition shown in the table was prepared and diluted with water by 185 times to be used as an agrochemical spray solution. This agrochemical spray solution was used for foliar spray so as to be applied on the entire plant body at an application amount of 500 L/ha, and an herbicidal efficacy was evaluated. For the evaluation of the herbicidal efficacy, a mass of the above-ground part was measured on day 14 after the spraying, and an herbicidal rate was calculated, with a mass of an above-ground part of a plant grown in a non-treated area used as a reference, in accordance with the following equation. As the value of the herbicidal rate is larger, the agrochemical efficacy (herbicidal effect) is higher. The term "non-treated area" used herein refers to an area where the diluted mixture (the agrochemical spray solution) of the agrochemical and the efficacy-enhancing agent composition for agrochemicals was not sprayed (the same is applied to other tests).

Herbicidal Rate (%)=(Mass of above-ground part in non-treated area−Mass of above-ground part in treated area)/Mass of above-ground part in non-treated area×100

One having an herbicidal rate of less than 80% is at such a level that an herbicidal effect cannot be expected.

Besides, no herbicidal property test was conducted on one having an evaluation score of 1 in the formulation stability test.

TABLE 3

| | | Agrochemical composition | | | | | | | | | | | |
|---|---|---|---|---|---|---|---|---|---|---|---|---|---|
| | | Eficacy-enhancing agent composition for agrochemicals | | Agrochemical active ingredient (C) | | | Content (% by mass) | | | | | Evaluation | |
| | | Type | Content (% by mass) | Type | Content (% by mass) | Water Content | Compound (A1) | Compound (A2) | Compound (A3) | Compound (A4) | Compound (B) | Formulation stability | Herbicidal property (%) |
| Example | 2-1 | Example 1-1 | 7.5 | c-1 | 41 | Balance *1 | 3.85 | 1.58 | 0.23 | 1.73 | 0.11 | 5 | 85 |
| | 2-2 | Example 1-2 | 7.5 | c-1 | 41 | Balance *1 | 3.73 | 1.54 | 0.22 | 1.68 | 0.34 | 5 | 88 |
| | 2-3 | Example 1-3 | 7.5 | c-1 | 41 | Balance *1 | 3.62 | 1.48 | 0.21 | 1.64 | 0.56 | 5 | 90 |
| | 2-4 | Example 1-4 | 7.5 | c-1 | 41 | Balance *1 | 3.81 | 1.58 | 0.23 | 1.80 | 0.09 | 5 | 85 |
| | 2-5 | Example 1-5 | 7.5 | c-1 | 41 | Balance *1 | 3.81 | 1.49 | 0.23 | 1.88 | 0.10 | 5 | 88 |
| | 2-6 | Example 1-6 | 7.5 | c-1 | 41 | Balance *1 | 3.84 | 1.58 | 0.23 | 1.73 | 0.13 | 5 | 90 |
| | 2-7 | Example 1-7 | 7.5 | c-1 | 41 | Balance *1 | 3.82 | 1.57 | 0.23 | 1.79 | 0.10 | 5 | 85 |
| | 2-8 | Example 1-1 | 7.5 | c-2 | 20 | Balance *1 | 3.85 | 1.58 | 0.23 | 1.73 | 0.11 | 5 | 85 |
| | 2-9 | Example 1-8 | 7.5 | c-1 | 41 | Balance *1 | 3.41 | 2.54 | 0.49 | 0.98 | 0.10 | 5 | 82 |
| | 2-10 | Example 1-9 | 7.5 | c-1 | 41 | Balance *1 | 3.87 | 1.59 | 0.22 | 1.79 | 0.04 | 5 | 83 |
| Comparative Example | 2-1 | Comparative Example1-1 | 7.5 | c-1 | 41 | Balance *1 | 3.54 | 1.46 | 0.21 | 1.59 | 0.71 | 1 | — |
| | 2-2 | Comparative Example1-2 | 7.5 | c-1 | 41 | Balance *1 | 3.47 | 1.43 | 0.20 | 1.56 | 0.85 | 1 | — |
| | 2-3 | Comparative Example1-3 | 7.5 | c-1 | 41 | Balance *1 | 4.20 | 1.20 | 0.60 | 1.43 | 0.06 | 4 | 71 |

*1 Amount necessary for making total content of agrochemical composition 100% by mass 5: Transparence and homogeneity were retained for 10 days or more.
4: Transparence and homogeneity were retained for 8 to 9 days.
3: Transparence and homogeneity were retained for 3 to 7 days.
2: Transparence and homogeneity were retained for 1 to 2 days.
1: Separation or precipitation occurred within 1 day.

[Herbicidal Property Test]

A barnyard grass was grown in a 12 cm-pot, and a plant body thereof having a height of about 30 cm was used for the

The invention claimed is:

1. An agrochemical composition, comprising 2 to 10% by mass of a compound (A1) represented by the following formula (1-1), 0.01 to 0.7% by mass or less of a compound (B) represented by the following formula (2), 10 to 70% by mass of amino acid-based agrochemical active ingredient (C), water, and 0.5 to 5.0% by mass of a compound (A2) represented by the following formula (1-2), and 0.05 to 1.0% by mass of a compound (A3) represented by the following formula (1-3), wherein
a mass ratio of a content of the compound (A3) to a sum of a content of the compound (A1) and a content of the compound (A2), [content of compound (A3)]/[sum of content of compound (A1) and content of compound (A2)], is in the range from 1/99 through 9/91;
a mass ratio of the content of the compound (A2) to the content of the compound (A1), [content of compound (A2)]/[content of compound (A1)], is in the range from 5/95 through 60/40; and
a mass ratio of a content of the compound (B) to the content of the compound (A1), [content of compound (B)]/[content of compound (A1)], is in the range from 1/500 through 1/5.2:

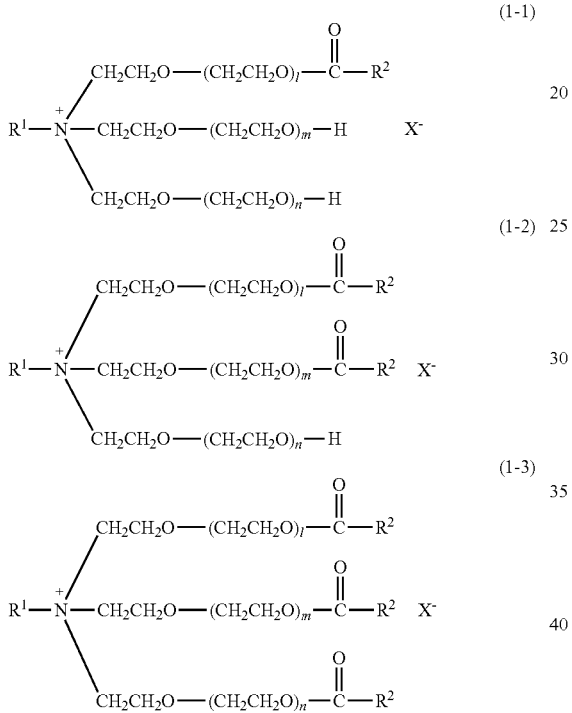

wherein R¹ denotes a linear alkyl group having from 1 to 4 carbon atoms, a linear alkenyl group having from 2 to 4 carbon atoms, a branched alkyl group having 3 or 4 carbon atoms, or a branched alkenyl group having 3 or 4 carbon atoms; R² denotes a linear or branched alkyl group or alkenyl group having from 5 to 17 carbon atoms; each of l, m, and n denotes an average number of moles of added CH₂CH₂O group, a total of l, m, and n [l+m+n] being in the range from 1 through 15; and X⁻ denotes a counter ion; and

R³—COOH        (2)

wherein R³ denotes a linear or branched alkyl group or alkenyl group having from 5 to 17 carbon atoms.

2. The agrochemical composition according to claim 1, comprising an efficacy-enhancing agent composition for amino acid-based agrochemicals;
wherein the efficacy-enhancing agent composition for amino acid-based agrochemicals comprises a compound (A1) represented by the following formula (1-1), a compound (B) represented by the following formula (2), a compound (A2) represented by the following formula (1-2), and a compound (A3) represented by the following formula (1-3),
wherein
a mass ratio of a content of the compound (A3) to a sum of a content of the compound (A1) and a content of the compound (A2), [content of compound (A3)]/[sum of content of compound (A1) and content of compound (A2)], is in the range from 1/99 through 9/91;
a mass ratio of the content of the compound (A2) to the content of the compound (A1), [content of compound (A2)]/[content of compound (A1)], is in the range from 5/95 through 60/40; and
a mass ratio of a content of the compound (B) to the content of the compound (A1), [content of compound (B)]/[content of compound (A1)], is in the range from 1/500 through 1/5.2:

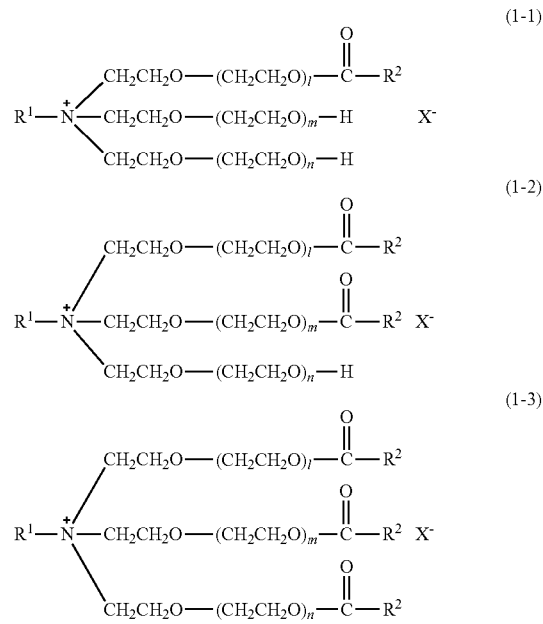

wherein R¹ denotes methyl or ethyl; R² denotes a linear or branched alkyl group or alkenyl group having from 5 to 17 carbon atoms; each of l, m, and n denotes an average number of moles of added CH₂CH₂O group, a total of l, m, and n [l+m+n] being in the range from 1 through 15; and X⁻ denotes a halide ion or an alkyl sulfate anion; and

R³—COOH        (2)

wherein R³ denotes a linear or branched alkyl group or alkenyl group having 5 to 17 carbon atoms.

3. The agrochemical composition according to claim 2, wherein amino acid-based agrochemical active ingredient (C) is N-(phosphonomethyl)glycine or a salt thereof.

4. A weeding method, comprising spraying, on a plant, an agrochemical spray solution prepared from an agrochemical composition according to claim 1.

* * * * *